(12) United States Patent
Hillar et al.

(10) Patent No.: US 10,489,707 B2
(45) Date of Patent: Nov. 26, 2019

(54) UNSUPERVISED HIGH-DIMENSIONAL BEHAVIORAL DATA CLASSIFIER

(71) Applicant: The Regents of The University of California, Oakland, CA (US)

(72) Inventors: Christopher Jacques Hillar, San Francisco, CA (US); Laurence Howard Tecott, San Francisco, CA (US)

(73) Assignee: The Regents of the University of California, Oakland, CA (US)

(*) Notice: Subject to any disclaimer, the term of this patent is extended or adjusted under 35 U.S.C. 154(b) by 533 days.

(21) Appl. No.: 15/126,994

(22) PCT Filed: Mar. 20, 2015

(86) PCT No.: PCT/US2015/021864
§ 371 (c)(1),
(2) Date: Sep. 16, 2016

(87) PCT Pub. No.: WO2015/143393
PCT Pub. Date: Sep. 24, 2015

(65) Prior Publication Data
US 2017/0177995 A1 Jun. 22, 2017

Related U.S. Application Data

(60) Provisional application No. 61/968,227, filed on Mar. 20, 2014.

(51) Int. Cl.
*G06N 3/08* (2006.01)
*G06F 16/28* (2019.01)
(Continued)

(52) U.S. Cl.
CPC ......... *G06N 3/08* (2013.01); *G06F 16/24578* (2019.01); *G06F 16/287* (2019.01); *G06F 16/35* (2019.01); *G06F 16/355* (2019.01)

(58) Field of Classification Search
CPC .. G06F 16/287; G06F 16/24578; G06F 16/35; G06F 16/355; G06N 3/08; G06N 3/02; G06N 20/00
(Continued)

(56) References Cited

U.S. PATENT DOCUMENTS 6,606,625 B1 8/2003 Muslea et al.
8,544,087 B1 9/2013 Eskin et al.
(Continued)

FOREIGN PATENT DOCUMENTS

EP 1204949 B1 10/2003
WO WO 2013/138513 A1 9/2013

OTHER PUBLICATIONS

Wikipedia, Precision and recall, Mar. 2014.*
(Continued)

*Primary Examiner* — William A Jerez Lora
(74) *Attorney, Agent, or Firm* — Weaver Austin Villeneuve & Sampson LLP

(57) ABSTRACT

Methods for classifying subjects and analyzing the relation between subject classification and multiple features of the subjects are provided. Some embodiments of the disclosure provide processes that use clustering analysis as an unsupervised machine learning technique to classify subjects based on multiple features. Some embodiments may associate features of the subjects with a categorical variable on which subject groups are based. This association between the features and the categorical variable of interest (or subject groups) can be obtained by finding featured-based clusters that have similar members as the subject groups. Systems and computer program products implementing the methods are also disclosed.

19 Claims, 12 Drawing Sheets

(51) Int. Cl.
*G06F 16/2457* (2019.01)
*G06F 16/35* (2019.01)

(58) Field of Classification Search
USPC .......................................... 706/6, 12, 15, 20
See application file for complete search history.

(56) References Cited

U.S. PATENT DOCUMENTS

| | | | |
|---|---|---|---|
| 2005/0209785 A1* | 9/2005 | Wells | G16H 50/20 |
| | | | 702/19 |
| 2008/0306980 A1 | 12/2008 | Brunner et al. | |
| 2009/0024555 A1 | 1/2009 | Rieck et al. | |
| 2010/0120899 A1* | 5/2010 | Reeves | C12Q 1/6886 |
| | | | 514/44 R |
| 2010/0332430 A1 | 12/2010 | Caraviello et al. | |
| 2011/0040491 A1 | 2/2011 | Sontrop et al. | |
| 2011/0179044 A1* | 7/2011 | Crum | G06K 9/342 |
| | | | 707/749 |
| 2011/0258150 A1* | 10/2011 | Neogi | G06K 9/00442 |
| | | | 706/12 |
| 2011/0289025 A1* | 11/2011 | Yan | G06N 20/00 |
| | | | 706/12 |
| 2012/0245481 A1 | 9/2012 | Blanco et al. | |
| 2013/0090706 A1* | 4/2013 | Nudo | A61N 1/36103 |
| | | | 607/62 |
| 2014/0030261 A1* | 1/2014 | Verweij | G01N 33/564 |
| | | | 424/133.1 |
| 2014/0156573 A1* | 6/2014 | Szyperski | G01R 33/4625 |
| | | | 706/12 |

OTHER PUBLICATIONS

International Search Report and Written Opinion dated Jun. 29, 2015 issued in PCT/US2015/021864.
International Preliminary Report on Patentability dated Sep. 29, 2016 issued in PCT/US2015/021864.

* cited by examiner

UNSUPERVISED HIGH-DIMENSIONAL BEHAVIORAL DATA CLASSIFIER

CROSS-REFERENCE TO RELATED APPLICATIONS

This application is filed pursuant to 35 U.S.C. § 371 as a United States National Phase Application of International Application No. PCT/US2015/021,864, filed Mar. 20, 2015, which claims the benefit of and priority to U.S. Provisional Application Ser. No. 61/968,227, filed Mar. 20, 2014, the contents of which prior applications are incorporated herein by reference in their entireties and for all purposes.

BACKGROUND

In analysis of various categorical variables of interest (e.g., disease state, genotype, phenotype, behaviors of interest, company profitability, and so on), experimental groups may be organized based on the categorical variables of interest. One approach to investigate the features or characteristics that affect or relate to the categorical variable of interest is to classify the individual subjects, objects, or entities into experimental groups based on the variables of interest, and analyze the statistical relationship between features and group membership.

Commonly used approaches to discriminate among experimental groups having multiple features employ supervised classification approaches that require prior knowledge of the features that best discriminate between the groups. Such knowledge is not readily available in behavioral science, so an experimenter's attempts to impose criteria for categorization are prone to error. The ability to achieve classification without reliance on preconceptions enables unbiased identification of the most salient features with high accuracy. Embodiments disclosed herein provide efficient methods and system for classifying subjects and objects, and analyzing features and factors associated variables of interest.

SUMMARY

In one aspect, methods are provided for subject classification using unsupervised machine learning approaches. In some embodiments, the methods are implemented on a computer system that includes one or more processors and system memory. In some embodiments, a method includes the following operations: (a) providing, on the computer system, a dataset including a plurality of feature vectors for a plurality of subjects in a pair of subject groups, wherein each feature vector includes data for one or more features for one subject; (b) splitting, by the computer system, the plurality of subjects into a pair of clusters by performing a cluster analysis for each feature, thereby obtaining a plurality of cluster pairs; (c) scoring, by the computer system, each feature's ability to discriminate between the pair of subject groups; (d) selecting, by the computer system, two or more features that score higher than other features; and (e) combining, by the computer system, the selected features to form a pair-wise discriminator between the pair of subject groups. In some embodiments, the method also includes (f) repeating (a)-(e) for additional pairs of subject groups, thereby forming pair-wise discriminators for multiple pairs of subject groups. In some embodiments, the method further includes (g) classifying which subject group a test subject belongs to by applying the pair-wise discriminators of one or more pairs of subject groups. In some implementations, (g) involves determining which one of the two groups in a pair of subject groups is a nearest neighbor of the test subject for each pair of the subject groups, and classifying the subject as a member of the subject group that is most frequently determined to be the nearest neighbor across all pairs of subject groups under consideration. In some implementations, the method for subject classification further involves obtaining a p value of the classifying of (g), which p value indicates the probability of random selection yielding the same results as the classifying of (g). In some implementations, p value is smaller than $10^{-2}$. In some implementations, p value is smaller than $10^{-40}$. In some implementations, the classifying of (g) achieves at least 90% accuracy In some implementations of any of the methods described above, the selected features include two or more features. In some implementations, the scoring of (c) is based on membership in the subject groups and the clusters. In some implementations, the cluster analysis involves a K-means clustering. In some implementations, the two clusters in (b) are one-dimensional clusters and a cluster pair is associated with one feature. In some other implementations, the two clusters in (b) are multi-dimensional clusters and a cluster pair is associated with multiple features. In some implementations, (e) involves splitting at least some of the plurality of subjects into two multidimensional clusters by performing a K-means clustering for the combined features, and using information of the two multidimensional clusters to form a pair-wise discriminator between the subject groups. In some implementations, the methods above further involves cross-validating the pair-wise discriminator using data of subjects complementary to the subjects used to form the pair-wise discriminator.

In some implementations of any of the methods described above, the clustering in (b) is performed on a training set including a randomly selected subset of the dataset, the method further involves cross-validating the pair-wise discriminator using a test set complementary to the training set. In some implementations, (c) involves calculating a score based on (i) the count of the more common subject group for each cluster, and (ii) the count of the more common cluster for each subject group.

In some implementations of any of the methods described above, at least some feature vectors include behavioral measurements. In various implementations, the subjects are rodents, mice, mammals, humans, etc. In various implementations, subject groups are defined by genotype, drug treatment, diet, or treatment by a hormone (e.g., corticosterone). In some implementations, the subject groups are defined by disease states and the features are clinical features, the method further involving identifying clinical features as disease susceptibility factors. In some implementations, two subject groups are normal mice and humanized mouse models of a disease of interest. In some implementations, the two subject groups defined by normal versus high fat diet.

In some implementations of any of the methods described above, the dataset includes behavioral data collected from an animal cage that monitors animal behavioral.

In some implementations, a method is provided for subject classification. The method involves: (a) providing a dataset including a plurality of feature vectors for a plurality of subjects in a pair of subject groups, wherein each feature vector includes data for one or more features for one subject, each feature including a unit of measurement data; (b) splitting the plurality of subjects into a pair of clusters by performing a cluster analysis for each feature, thereby obtaining a plurality of cluster pairs; (c) combining two or more features to form a pair-wise discriminator between the pair of subject groups.

In some implementations, a method is provided for subject classification. The method is implemented at a computer system that includes one or more processors and system memory. The method involves: (a) providing, on the computer system, a dataset including a plurality of data vectors for a plurality of subjects in a pair of subject groups, wherein each data vector includes data for two or more characteristics for one subject, and (b) applying unsupervised machine learning to split the plurality of subjects into a pair of clusters for each characteristics. In some implementations, the method further involves: (c) combining, by the computer system, two or more characteristics to form a pair-wise discriminator between the pair of subject groups.

In some implementations, a method of unsupervised machine learning for analysis of data representing features of animals is provided. The method involving: comparing multiple parameters among multiple groups by performing K-means analysis on all possible pair-wise combinations of animal groups. In some implementations, the method further involves quantifying the extent to which each individual feature contributes to the discriminability among all groups or any subset of two or more groups. In some implementations, the method further involves assigning classifications to each subject.

One aspect of the disclosure provides an unsupervised classification system for classifying subjects into two or more groups of interest. The system includes one or more memories configured to store feature vectors; and logic configured to: (a) provide a feature vector for each of a plurality of subjects in a pair of subject groups, wherein each feature vector includes data for a plurality of features for one subject, each feature corresponding to a behavior, property or characteristic of the subject; (b) split the plurality of subjects into two clusters by performing a cluster analysis for each feature; (c) score each feature by comparing subjects in the two clusters for each feature and subjects in the pair of subject groups; (d) select one or more features that score higher than other features; and (e) combine the selected features to form a pair-wise discriminator between the pair of subject groups. In some implementations, the system further involves an animal monitoring device configured to collect data of a plurality of features from animal subjects.

Another aspect of the disclosure provides a system for classifying animal subjects. The system includes an animal monitoring device that collects data of two or more features for each animal, each feature including a unit of measurement data; a processor; and a machine readable storage medium including instructions for execution on said processor. The instructions includes: (a) code for providing a dataset including a plurality of feature vectors for a plurality of subjects in a pair of subject groups, wherein each feature vector includes data collected by the animal monitoring sensor; (b) code for splitting the plurality of subjects into a pair of clusters by performing a cluster analysis for each feature, thereby obtaining a plurality of cluster pairs; and (c) code for combining two or more features to form a pair-wise discriminator between the pair of subject groups. In some implementations, the instructions further includes: before (c), scoring each feature's ability to discriminate between the pair of subject groups and selecting two or more features that score higher than other features, wherein the selected features are used in (c) to form the pair-wise discriminator.

An additional aspect of the disclosure provides a computer program product including a non-transitory machine readable medium storing program code that, when executed by one or more processors of a computer system, causes the computer system to implement a method for classifying animals. The program code includes: (a) code for providing a dataset including a plurality of feature vectors for a plurality of subjects in a pair of subject groups, wherein each feature vector includes data collected by the animal monitoring sensor; (b) code for splitting the plurality of subjects into a pair of clusters by performing a cluster analysis for each feature, thereby obtaining a plurality of cluster pairs; and (c) code for combining two or more features to form a pair-wise discriminator between the pair of subject groups. In some implementations, the program code further includes: code for scoring, before (c), each feature's ability to discriminate between the pair of subject groups and selecting two or more features that score higher than other features, wherein the selected features are used in (c) to form the pair-wise discriminator.

A further aspect of the disclosure provides a method, implemented at a computer system that includes one or more processors and system memory, for entity classification. The method includes: (a) providing, on the computer system, a dataset including a plurality of feature vectors for a plurality of entities in a pair of entity groups, wherein each feature vector includes data for one or more features for one subject, each feature including a unit of measurement data; (b) splitting, by the computer system, the plurality of entities into a pair of clusters by performing a cluster analysis for each feature, thereby obtaining a plurality of cluster pairs; (c) scoring, by the computer system, each feature's ability to discriminate between the pair of entity groups; (d) selecting, by the computer system, two or more features that score higher than other features; and (e) combining, by the computer system, the selected features to form a pair-wise discriminator between the pair of entity groups. In some implementations, the method further includes: (f) repeating (a)-(e) for additional pairs of entity groups, thereby forming pair-wise discriminators for multiple pairs of entity groups. In some implementations, the method further includes: (g) classifying which entity group a test entity belongs to by applying the pair-wise discriminators of one or more pairs of entity groups.

Also provided are computer program products including a non-transitory machine readable medium storing program code for implementing at least some portion of the methods described above. Any of the methods described herein may be represented, in whole or in part, as program instructions that can be provided on such non-transitory machine readable media. Also provided are system for classifying animals using methods described herein.

These and other objects and features of the present disclosure will become more fully apparent from the following description and appended claims, or may be learned by the practice of the disclosure as set forth hereinafter.

DETAILED DESCRIPTION

Introduction

Figure 1A:
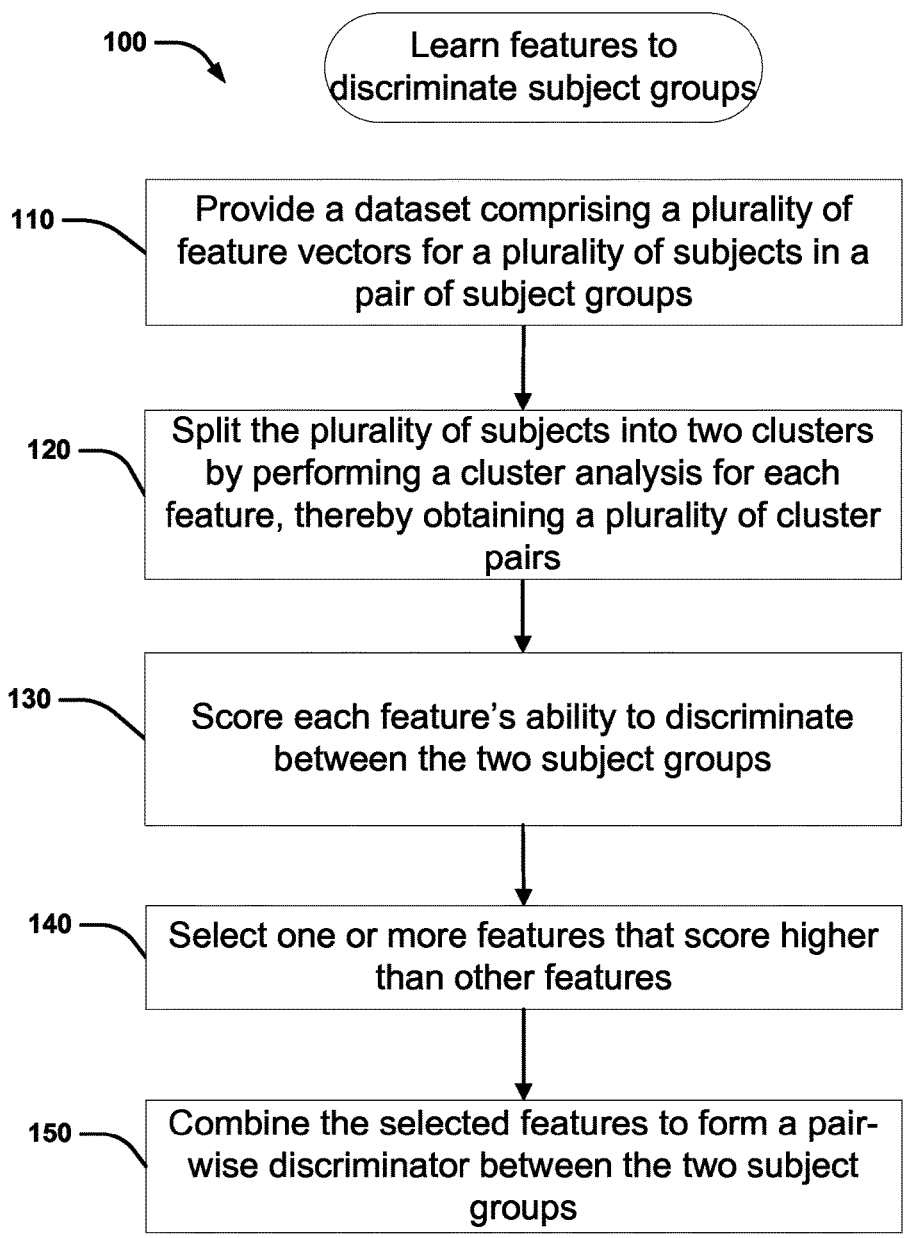
FIG. 1A-1C shows flow charts showing processes used to classify subjects having multiple features according to various embodiments of the disclosure.

The disclosed embodiments concern methods, apparatus, and systems for classifying subjects or entities having multiple features and analyzing the relation between features and the variables of interest on which the classification is based. Many examples and embodiments described herein concern animal and human subjects. However, the disclosed processes are also applicable to classify other entities having multiple properties. The methods, systems, and computer program products have utility that is widely generalizable, and are applicable to the many instances in which value can be obtained from the ability to classify subjects (or inanimate items) into multiple categories.

Commonly used approaches to discriminate among experimental groups having multiple features employ supervised classification approaches that require prior knowledge of the features that best discriminate the groups. Such knowledge is not readily available in behavioral science, so an experimenter's attempts to impose criteria for categorization are prone to error. In some embodiments, the methods and systems for classifying subjects disclosed herein provide an unsupervised machine learning approach to accurate classification on the basis of feature data alone without reliance on preconceptions about the subject's group identity or feature-group relation. It enables unbiased identification of the most salient features with high accuracy.

Supervised machine learning methods often lack robust metrics for determining the statistical significance of the classifications identified. In contrast, the statistical significance of classifications according to some embodiments disclosed herein may be readily determined. This is because supervised approaches require model assumptions that complicate statistical assessment.

Some embodiments enable determination of empirical conditions on behaviors with high comprehensiveness, accuracy, and statistical verifiability. In some embodiments, the disclosure enables precise assessment of the impact of experimental conditions, such as genetic background, on multiple behaviors with high sensitivity. This capability can be valuable in early-stage drug discovery, for which powerful methods for precise determination of drug effects on behavior can be useful for identifying compounds with efficacies related to particular neuropsychiatric disorders and identifying toxic effects of compounds manifested by behavioral change.

The headings provided herein are not intended to limit the disclosure.

Unless defined otherwise herein, all technical and scientific terms used herein have the same meaning as commonly understood by one of ordinary skill in the art. Various scientific dictionaries that include the terms included herein are well known and available to those in the art. Although any methods and materials similar or equivalent to those described herein find use in the practice or testing of the embodiments disclosed herein, some methods and materials are described.

The terms defined immediately below are more fully described by reference to the specification as a whole. It is to be understood that this disclosure is not limited to the particular methodology, protocols, and reagents described, as these may vary, depending upon the context they are used by those of skill in the art.

As used herein, the singular terms "a," "an," and "the" include the plural reference unless the context clearly indicates otherwise.

The term "feature" is used herein with reference to an individual measurable property or characteristic of a phenomenon (e.g., an event or behavior) being observed. In some embodiments, a feature is associated with measurement data. In some embodiments, a feature is a unit of measurement data. In some embodiments, the data or value(s) of a feature are numerical value(s) that represent a property of a subject. In some embodiments, the measurement data is collected in a defined time period. In some embodiments, the measurement data is provided by a sensor, e.g., a motion sensor in an animal monitoring system. In some embodiments, the measurement data may include behavioral data. In some embodiments, the measurement data may include one or more physiological measurements, e.g., blood pressure, genotype, etc.

In some embodiments, features can be obtained from large datasets. Such datasets may contain, for example, one or more of behavioral data, clinical measures, demographic descriptors, and environmental influences. Examples of such features can include clinical measures such as reported systems, blood test results or imaging test results, demographic descriptors such as gender, age, race, income, and family history, environmental influence such as job satisfaction, marital satisfaction, exposures to trauma, and dietary factors.

Measurements or other data derived from datasets may be organized in various manners to form features according to various implementations. In an example, a feature can be a total food intake measured by a photo beam in a 24 hour period. In some embodiments, features may be binned by time, e.g., food intake measured in 2 hour intervals over a 24 hour period may form 12 features: food intake from 12 am-2 am, food intake from 2 am-4 am, etc. Still further, unit of data may be organized in various manners depending on the specific implementation. For example, while in many embodiments, a feature may be associated with a single feature value (e.g., grams of food); in other embodiments, a feature may also be associated with multiple values. For example, a feature can be percent activity in 10 minute intervals for a period of 1 hour, resulting in six values associated with the feature, each value for a 10-minute interval. In some embodiments, a unit of data is collected in a continuous time period. In other embodiments, a unit of data may be collected from different time points not in a continuous time period. For instance, one feature may include active state durations during light-cycle hours throughout 30 days. In another example, one feature may be a mean active state duration of light-cycle hours over 30 days.

The term "feature vector" is used herein with reference to a data structure including data for one or more features for a particular subject. It is worth noting that a feature may include data in scalar, vector, or matrix form. Therefore, a feature vector may have data in n-dimensional array, where n is not smaller than 1. Namely, the "vector" in feature vector is not limited to a one-dimensional array of scalars.

"Subject groups" in the context of this disclosure may be groups of individuals that are formed based on various factors of interest that may be affected or correlated with features. In many embodiments, it may be desirable to affect or determine a subject's membership in subject groups. In some embodiments, subject groups may be formed based on genotype, phenotype, physical state, mental state, disease state, consumer behaviors, etc. For instance, a pair of subject groups may be: a male subject group and a female subject groups, a wild-type animal group and a mutant animal group, an obese animal group and a non-obese animal group, companies with rising stock values and companies with falling stock values, a control subject group and a treated subject group, a control subject group and a cancer subject group, and so on.

"Cluster analysis" or "clustering" is the process of grouping a set of subjects (or other entities) in such a way that subjects in the same group (called a cluster) are more similar (in some sense or another) to each other than to those in other groups. Clustering can be performed based on one or more variables of interest. In this disclosure, clustering may be performed based on one or more features. When a cluster is based on one feature or variable, it may be referred to as a one-dimensional cluster. When a cluster is based on multiple features or variables, it may be referred to as a multi-dimensional cluster.

Clustering can be achieved by various algorithms that differ significantly in their notion of what constitutes a cluster and how to efficiently find them. Popular notions of clusters include groups with small distances among the cluster members, dense areas of the data space, or particular statistical distributions. Cluster analysis methods include hierarchical clustering, partitioning clustering, model based clustering, and various other clustering techniques.

The term "cluster pair" is used in reference to two clusters formed from a cluster analysis. In some implementations, two and only two clusters are formed from a cluster analysis. In some implementations, a clustering process can be based on one feature, thereby forming one-dimensional clusters. In other implementations, a clustering process can be based on multiple features, thereby forming multidimensional clusters. Accordingly, cluster pairs can be one-dimensional or multidimensional. For instance, if there are six features, six one dimensional clustering routines may be performed, thereby forming six cluster pairs. Alternatively, two three-dimensional clustering routines may be performed, thereby forming two three-dimensional cluster pairs.

K-means clustering is a partitioning clustering method. It forms clusters based on the distance between a data point and a representative point of a cluster, e.g., a centroid of the cluster. In some embodiments, K-means clustering starts by providing K clusters and K arbitrary starting points of the clusters. The clustering process then compares the distances between each data point and the K starting points and assigns the data point to a cluster having the closest starting point. The analysis then obtains the centroid of each cluster, and updates the assignment of data points to clusters having the closest centroid from the data points. The analysis continues updating the clusters until it minimizes the distance (e.g., Euclidean or Manhattan distances) between the data points and the centroids of the clusters. In some embodiments, K-means clustering involves specifying the number of clusters to extract. In some embodiments, a within-group sum of squares is minimized to find the optimal number of clusters.

A pairwise discriminator is a classification tool that can be used to classify a subject into one of two groups of interest. For instance, a pairwise discriminator may include two centroids of two clusters in a feature space and rules for classifying a subject having a feature vector based on the distance between the feature vector and the centroids of the two clusters. The two clusters and the two groups of interest have similar members. As the pairwise discriminator is applied to a subject's feature vector, it classifies the subject into the group corresponding to the cluster whose centroid is closer to the subject's feature vector.

Multiple pairwise discriminators may be combined to classify subjects into three or more groups. For instance, if there are n groups, the total possible pairs of groups could be represented as $C(n,2)=n!/(r!(n-r)!)$. $C(n,2)$ pairwise discriminators can be combined to classify a subject in n groups.

While the description below refers chiefly to classification of human and/or animal subjects, the methods disclosed herein may also be applied to classification of any entity for which multiple properties can be measured. An example of such an entity is an email; individual emails have multiple properties such as length, language, frequencies of various types of words, sender, and recipient. Categories into which emails may be grouped can include work vs. personal emails, messages from teenagers vs. baby boomers, and emails relevant to politics vs. sports.

Processes for Classifying Subjects

Some embodiments of the disclosure provide processes that use clustering analysis as an unsupervised machine learning approach to classify subjects based on features and characteristics. In machine learning, the problem of unsupervised learning is that of trying to find hidden structure in unlabeled data. Since the examples given to the learner are unlabeled, there is no error or reward signal to evaluate a potential solution. This distinguishes unsupervised learning from supervised learning and reinforcement learning.

Some embodiments may associate features and characteristics of the subjects with a categorical variable on which subject groups are based. This association between the features and the categorical variable of interest (or subject groups) is obtained by finding featured-based clusters that have similar members as the subject groups. In some embodiments, clustering analyses are performed feature by feature. Then the features are ranked by their ability to discriminate the subject groups, e.g., by comparing subjects' membership of the clusters and the subject groups. In some embodiments, multiple highly ranked features are combined to form a pair-wise discriminator between a pair of subject groups. The pair-wise discriminator provides a highly accurate mechanism to classify the subjects using the combined features, which features are associated with the factor/variable on which the subject groups are based. Multiple pair-wise discriminators may be combined to classify three or more subject groups as further described below.

FIG. 1A is a flowchart showing a process 100 to learn features of multiple subjects having multiple features to classify subjects into two or more subject groups. A feature can be or be associated with a unit of measurement data organized in various ways as described above. The process starts by providing the dataset including a plurality of feature vectors for a plurality of subjects in a pair of subject groups. The dataset in the example of FIG. 1A includes data for two subject groups having multiple features. Each subject's data may be organized as a feature vector, and a feature vector includes one or more features. See block 110. Note that the dataset in process 100 includes data for two groups of subjects. In some embodiments, process 100 includes iterative applications of operation 110 for multiple datasets, each dataset including data for two subject groups. In some embodiments, the dataset includes behavioral data collected from an animal behavioral monitoring system such as an animal cage equipped to monitor animal behavioral. In some other embodiments, the dataset can include data derived from larger datasets of clinical, demographic, and/or environmental information. Private or publicly available datasets may be used to generate the dataset in block 110.

In some embodiments, the dataset includes a behavioral dataset, and at least some feature values include behavioral measurements. In various embodiments, the subjects may include rodents, mice, mammals, or humans, etc. In other embodiments, the subjects may be other animals. As stated above, although the examples described herein largely described features and groups for animal subjects, features and groups of other entities may also be analyzed using the processes described herein. For instance, companies have multiple properties (or features) that change over time, and these properties can be associated with stock values that fluctuate over time. The availability of longitudinal (time series) data allows companies to be classified into 2 groups by clustering analysis based on features or properties such as: company sector, company earnings, company expenditures, corporate market share, past maximal value, current value (or trends in value), and relative current values of stocks for competing companies, and so on. Entities (e.g., companies) having multiple features that can be segregated into at least 2 groups (rising vs falling stock values) may be analyzed using the process described herein.

In some embodiments, the subject groups may be defined by a genotype, a pretreatment, a diet, or a treatment, e.g., a hormone treatment using corticosterone. In some embodiments, the two subject groups are normal mice versus humanized mouse models of autism or other diseases. In some embodiments, the subject groups are defined by normal diet vs. a high-fat diet. In some embodiments, subject groups are defined by disease states and the features are clinical features. These embodiments provide methods for identifying clinical features as disease susceptibility factors, wherein the identified clinical features correlate with disease states of interest.

Referring to FIG. 1A, process 100 proceeds to split the plurality of subjects into two clusters by performing a cluster analysis for each feature. See block 120. In some embodiments, the cluster analysis is performed based on each one of the plurality of features, thereby obtaining one pair of clusters for each feature. A cluster in such a case is referred to as a one-dimensional cluster. In some embodiments, clustering may be performed based on two or more features, thereby obtaining multiple feature pairs depending on how many cluster analyses/routines are performed. A cluster in such a case is referred to as a multi-dimensional cluster.

In some embodiments, K-means clustering is used to analyze features and their relation to subject groups. In some embodiments, the following steps can be involved in using K-means clustering (K=2) to split data points representing vectors of features into two clusters.

1. Place K points into the space represented by the subjects that are being clustered. These points represent initial group centroids.
2. Assign each subject to the group that has the closest centroid.
3. When all subjects have been assigned, recalculate the positions of the K centroids.
4. Repeat Steps 2 and 3 until the centroids no longer move. This produces a separation of the subjects into two groups from which the metric to be minimized can be calculated. The metric may be a quantity that represents the sum or average of distances between the points and their respective cluster centroids.

In some embodiments, process 100 further involves scoring each feature's ability to discriminate between the two subject groups. See block 130. In some embodiments the scoring is performed by comparing the subjects in the clusters and the subjects in the subject groups. In some embodiments the scoring is based on the subjects' memberships in the subject groups vs. the subjects' memberships in the clusters. Namely, if the subjects in each subject group have common memberships in the clusters based on a feature, the feature scores high. Similarly, if the subjects in each cluster have common membership in the subject groups, the feature scores high. This scoring does not require knowledge of the underlying mechanism causing the clusters. However, the scoring does require the knowledge of the subjects' group membership/identity. This group membership may be deemed as the "ground truth" for evaluating the features' discriminability of the subject groups. A detailed example of the scoring method using the same approach is provided in an example hereinafter. In some embodiments, other methods for scoring the features are applicable, where the scoring is based on the membership consistency between the clusters and subject groups regardless of their labels.

Processor 100 proceeds by selecting one or more features that score higher than other features. Block 140. In some embodiments, the process ranks the features according to their scores, and selects the top ranked features. In some embodiments for instance, the top 10 features may be selected. Process 100 further involves combining the selected features to form a pairwise discriminator between the two subject groups under consideration. The pairwise discriminator provides an algorithm that takes multiple features of a subject to predict the subject's classification in one of the two subject groups. In many embodiments, at least two features are selected, one feature may be sufficient to form a discriminator.

There are various ways to combine multiple features to form a discriminator for the two subject groups. For instance, FIG. 1C is a flowchart describing a process 150 as an example of a process to combine features to form a pairwise discriminator. Process 150 can be a sub-process for process 100. Process 150 involves splitting into two clusters at least some of the plurality of subjects used to form the pairwise discriminator. See block 152. The subjects are split into two multidimensional clusters by performing a K-means clustering for the combined features, with the clustering performed on the multidimensional space defined by the multiple features that have scored highly based on the features ability to discriminate between the pair of subject groups under consideration. The process then proceeds to form a pairwise discriminator between the subject groups using information of the two multidimensional clusters. See block 154. The pairwise discriminator can be applied to a new test subject to determine which one of the two subject groups it belongs to.

Other ways may be used to combine multiple features to form a pairwise discriminator. For instance, a logistic regression may be used to combine the multiple features to predict the subject's group. The logistic regression may take the feature values as independent variables, and the group identity of the cluster analysis described above as the dependent variable. The logistic regression minimizes the errors of data of training subjects. Then the new test subject's group may be predicted by providing the subject's feature values to the logistic regression. Another way to combine the multiple features may use a voting mechanism, which has an adjustable threshold of required votes to determine the subject group.

In some embodiments, process 150 uses a subset of subjects in the plurality of subjects used to form the pairwise discriminator. This subset of subjects is called a training set. Optionally, in a later step, subjects complementary to the claiming set are used to cross validate the accuracy of the pairwise discriminator. See block 156 shown with dotted borders. In some embodiments involving an alternative way for cross validation, the clustering analysis in block 120 (in addition to or instead of block 152) may be performed on a training set including a randomly selected subset of the dataset. In such embodiments, the method further involves cross-validating the pair-wise discriminator obtained in block 150 using a test set subjects complementary to the training set subjects.

Figure 1B:
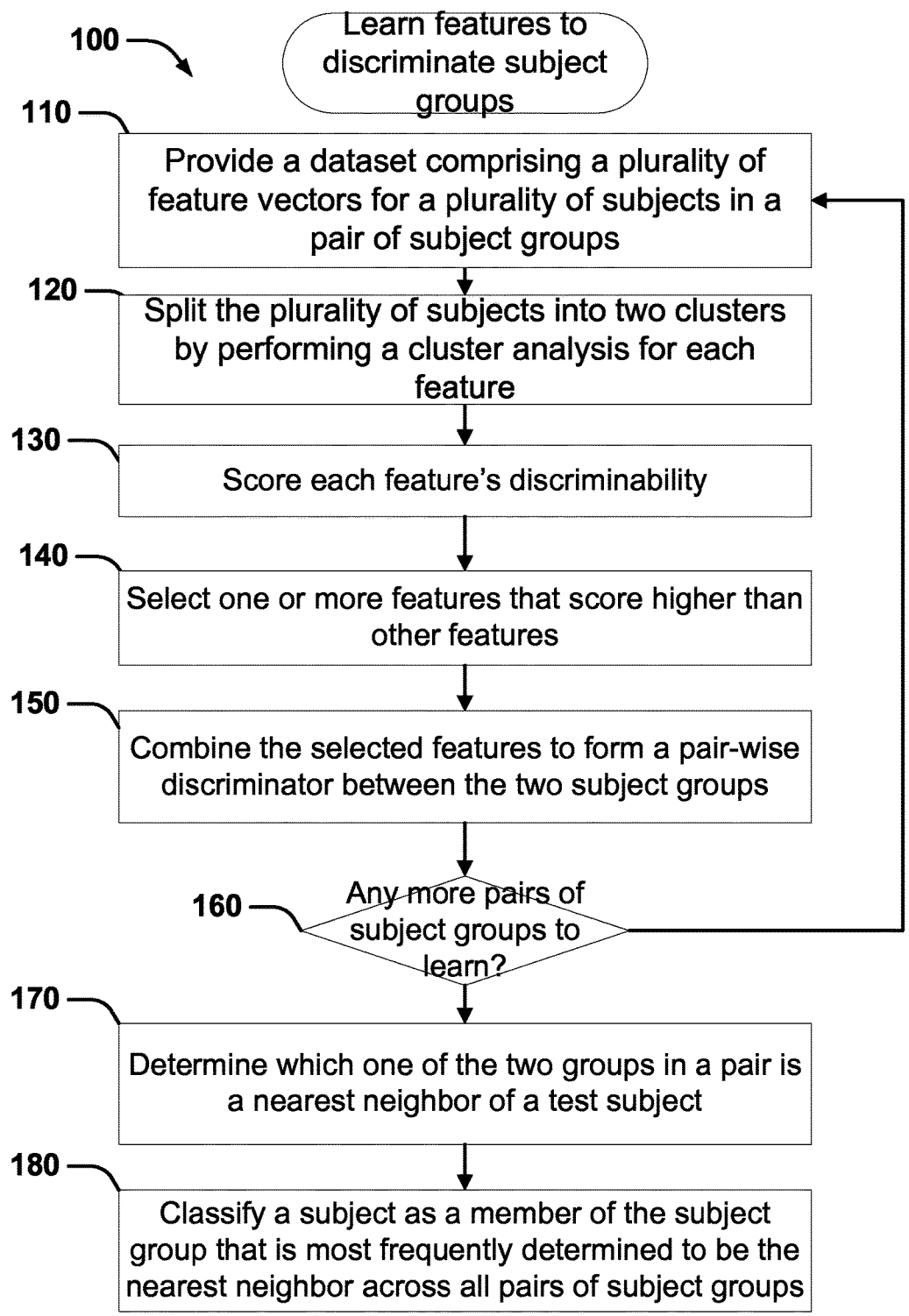
Figure 1C:
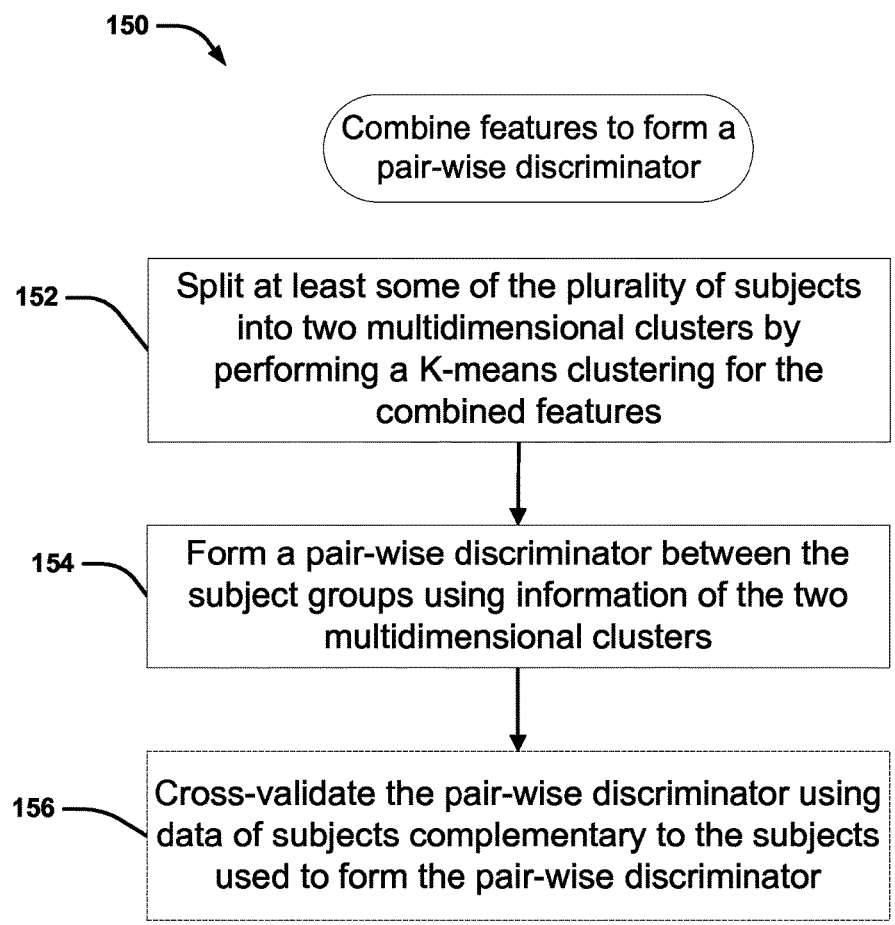

FIG. 1B is a flowchart showing a process for learning features to classify three or more subject groups. The process in FIG. 1A shows the operations involved in forming a pairwise discriminator between two subject groups. The process in FIG. 1B extends process 100 beyond operation 150 by iteratively going through operations 110-150 for additional pairs of subject groups to be learned. The process involves testing whether there are any more pairs of subject to be learned. See block 160. If so, the process returns to operation 110 by providing new data set including a plurality of feature vectors in a new pair of subject groups. The process then repeats operations 110-150. When no more pairs of subject groups need to be learned, the process proceeds to determine which one of the two groups in a pair the test subject belongs to according to a pairwise discriminator. In some embodiments in which the pairwise discriminator is based on clustering, the process determines that the new test subject belongs to the group whose centroid is closest to the new test subject. See block 170. The process involves applying all possible pairwise discriminators under consideration, and assigning the new test subject to one of the two groups for each pair of subject groups. The process finally tallies the groups that the new test subject is assigned to across all pairs of subject groups under consideration, and determines that the subject belongs to the group to which the subject has been most frequently assigned. In some embodiments, instead of, or in addition to, tallying the classifications, one may determine a set of (e.g., 16 mice strains) centroids from the best performing discriminators, and then use those centroids to classify a new data point by determining which of the centroids lies closest to a new data point).

Behavioral Monitoring System

Aspects of the disclosure relate to classification of subjects into groups by analyzing features that may correlate with or influence group classification. In some embodiments, the features and groups (or categories) may be provided by behavioral data. This section briefly describes systems and apparatus for the collection, management, and analysis of high-resolution behavioral data. These systems and methods provide an opportunity to examine behavioral patterns with levels of precision and quantization that have not been previously achieved. Methods and systems for managing and analyzing the very large and unique datasets produced by behavioral monitoring systems, including quality assessment and control, archiving, data query, data reduction, analytical procedures and visualization techniques are provided. Analyses of these behaviors may provide fundamental insights into the neural organization of behavior and enable detection of genetic, pharmacological and environmental influences on brain function with high sensitivity.

While some of the examples below involve systems, methods and apparatuses that relate to behavior of animal subjects in home cage monitoring (HCM) systems, as stated above, the disclosure is by no means so limited to data collected in this manner. For example, the methods and systems for analyzing behavioral data may be used with any behavioral monitoring system. Furthermore, for instance, the classification method involving unsupervised machine learning disclosed herein may be applied to physiological features and data as well.

In general, the behavioral monitoring systems that may provide data to be analyzed according to the disclosure include one or more devices in a defined area, at or with which the animal subject(s) being monitored interact. The monitoring system may be a home cage monitoring system such as described in U.S. Pat. No. 7,086,350, titled "Animal Cage Behavior System," incorporated herein by reference in its entirety for all purposes. Typically, the monitoring system provides continuous monitoring of movement and device event data over a measurement period. For example, the monitoring system may provide data resulting from continuous monitoring of movement (e.g., in the form of spatial position versus time), as well as ingestive events, sensory stimuli events, etc.

The behavioral monitoring systems used in accordance with the methods and systems of the disclosure may produce large volumes of data, e.g., a single subject over a day may produce tens to hundreds of thousands of movements, thousands to tens of thousands of ingestive events, etc. Multiplying this data by hundreds or thousands of subjects over weeks, years, etc. of observation requires techniques for robust automated quality assessment and correction of data.

Behavioral monitoring systems may be used to track behavioral events using devices. A behavioral event is an instance or occurrence of a particular type of behavior. Examples of types of behavioral events include events related to consumption behavior, (including consumption of food, liquid, medicines, pharmaceuticals, etc.), events related to movement behavior, events related to communication, events related to various common activities associated with the subject being monitored. For example, behavioral events that may be measured for a mouse in a cage include feeding, drinking and movement about the cage. Behavioral events that may be measured for a human include feeding, drinking, movement around a certain area, and using a particular electronic device such as a phone or computer, etc. Other behavioral events may relate to animal responses to particular stimuli or devices A device event is a behavioral event that involves interaction with a device at a known location. The location may be fixed or variable. Examples include feeding events, which occur at a feeder in a cage and lick events, which occur at lickometer in a cage. Other examples of a device event include use of a computer at a known location within a house, feeding events that occur at a particular restaurant as indicated by interaction with a device at that restaurant.

Examples of devices include a lickometer, a device that provides a measure of fluid consumption by an animal, and a feeder, a device that provides food to an animal in captivity. In certain embodiments, the feeder provides a measure of the amount of food consumed by the animal. Interaction with the device may be an interaction with the device necessary to the behavior being measured. For example, water consumption by a mouse may be measured at a lickometer by a change in capacitance in the licking spout when licked by the mouse to obtain water. Similarly, feeding may be measured by a photobeam and photobeam detector when an animal breaks a photobeam in order to reach food in a feeder. Other devices include running wheels, levers and holes. Levers and holes may be interacted with for delivery or provision of food, fluid, drugs, or any sensory stimulus. In certain embodiments, the device is an operant conditioning device. Interaction with a device may involve exposure to another animal, sensory stimuli (e.g., odorant) or a novel or familiar object, with the measurement providing behavioral information about the animal's subject response to the exposure or sensory stimuli, etc.

Movement data includes information about the movement of an animal subject in the measurement area. It may include spatial and temporal information, e.g., the spatial position of the animal at times during the measurement period. Movement data may also be collected at certain times, e.g., 1 second, though in many embodiments to reduce the amount of data in a raw data set, movement data may be collected when the animal moves more than a threshold amount. Data collection threshold distances vary according to the behavioral monitoring system and type of subject: for human subjects in a large measurement area, thresholds on the order of kilometers may be appropriate, for other animals, meters may be appropriate, for rodents centimeters, etc. Movement data may thus include the animal's positions and the time of each position, or the duration since the previous position. Position and/or movement may be measured by any number of mechanisms, including load beams, RFID transponders, satellite systems, video tracking, etc. The animal subject(s) behavior can be broken down into bouts and clusters. Bouts are the occurrence or repeated occurrences of the same behavioral act or indication of a behavioral act (e.g., food consumption or photobeam breaks) that appear to cluster together in time and/or are not separated by the intervention of a different behavior. In some embodiments, a bout may be characterized by the occurrence and/or repetition of a behavior at a particular location. Clusters are repeated bouts of the same behavioral act or indication of a behavioral act (e.g., food consumption or photobeam breaks) that appear to cluster together in time.

An animal subject(s) behavior may be further organized into states, e.g., active and inactive states. A state may be characterized by increased probability of a particular behavior or behaviors and/or the occurrence of these behaviors at one or more characteristic locations. For example, active states and inactive states may be classified. Active states are states in which there is an increased probability of some measured behaviors (such as feeding, drinking, or locomotion) occurring. Inactive states are states in which the probability of being in characteristic location or locations is high over some measurement window. These characteristic locations may act as refuge from predation or environmental conditions. During inactive states, the animal subject(s) may have an increased probability of engaging in certain measured behaviors (such as rest or sleep).

Methods of animal behavioral monitoring and related analysis, including active and inactive state classification, are disclosed in U.S. Patent Publication No. 2010-0324861 titled "Systems and Methods for Behavioral Monitoring and Calibration," incorporated by reference herein and for all purposes.

Computer System

Embodiments of the present disclosure relate to tangible and intangible computer readable media or computer program products that include program instructions and/or data (including data structures) for performing various computer-implemented operations. Computer readable media or computer program products that include program instructions and/or data (including data structures) for performing various computer-implemented operations. Examples of computer-readable media include, but are not limited to, magnetic media such as hard disks, floppy disks, magnetic tape; optical media such as CD-ROM devices and holographic devices; magneto-optical media; semiconductor memory devices, and hardware devices that are specially configured to store and perform program instructions, such as read-only memory devices (ROM) and random access memory (RAM), and sometimes application-specific integrated circuits (ASICs), programmable logic devices (PLDs) and signal transmission media for delivering computer-readable instructions, such as local area networks, wide area networks, and the Internet. The data and program instructions of this disclosure may also be embodied on a carrier wave or other transport medium (e.g., optical lines, electrical lines, and/or airwaves).

Database refers to a means for recording and retrieving information. The database may also provide means for sorting and/or searching the stored information. The database can include any convenient media including, but not limited to, paper systems, card systems, mechanical systems, electronic systems, optical systems, magnetic systems or combinations thereof. In certain embodiments databases include electronic (e.g. computer-based) databases. Computer systems for use in storage and manipulation of databases are well known to those of skill in the art and include, but are not limited to "personal computer systems", mainframe systems, distributed nodes on an inter- or intra-net, data or databases stored in specialized hardware (e.g. in microchips), and the like.

As should be apparent, certain embodiments of the disclosure employ processes acting under control of instructions and/or data stored in or transferred through one or more computer systems. Certain embodiments also relate to an apparatus for performing these operations. This apparatus may be specially designed and/or constructed for the required purposes, or it may be a general-purpose computer selectively configured by one or more computer programs and/or data structures stored in or otherwise made available to the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines is shown and described below.

In addition, certain embodiments relate to tangible machine readable media or computer program products that include program instructions and/or data (including data structures) for performing various computer-implemented operations associated with at least one or more of the following tasks: (1) obtaining raw data from instrumentation, (2) performing automated and user-interface data quality control, (3) providing a dataset including a plurality of feature vectors for a plurality of subjects in a pair of subject groups, wherein each feature vector includes data for one or more features for one subject, each feature including a unit of measurement data; (4) splitting the plurality of subjects into a pair of clusters by performing a cluster analysis for each feature, thereby obtaining a plurality of cluster pairs; (5) scoring each feature's ability to discriminate between the pair of subject groups; (6) selecting, by the computer system, two or more features that score higher than other features; (7) combining, by the computer system, the selected features to form a pair-wise discriminator between the pair of subject groups; and (8) classifying which subject group a test subject belongs to by applying the pair-wise discriminators of one or more pairs of subject groups.

The disclosure also pertains to computational apparatus executing instructions to perform any or all of these tasks. It also pertains to computational apparatus including computer readable media encoded with instructions for performing such tasks.

Examples of tangible computer-readable media suitable for use computer program products and computational apparatus of this disclosure include, but are not limited to, magnetic media such as hard disks, floppy disks, and magnetic tape; optical media such as CD-ROM disks; magneto-optical media; semiconductor memory devices (e.g., flash memory), and hardware devices that are specially configured to store and perform program instructions, such as read-only memory devices (ROM) and random access memory (RAM). The data and program instructions provided herein may also be embodied on a carrier wave or other transport medium (including electronic or optically conductive pathways).

Examples of program instructions include low-level code, such as that produced by a compiler, as well as higher-level code that may be executed by the computer using an interpreter. Further, the program instructions may be machine code, source code and/or any other code that directly or indirectly controls operation of a computing machine. The code may specify input, output, calculations, conditionals, branches, iterative loops, etc.

Figure 5:
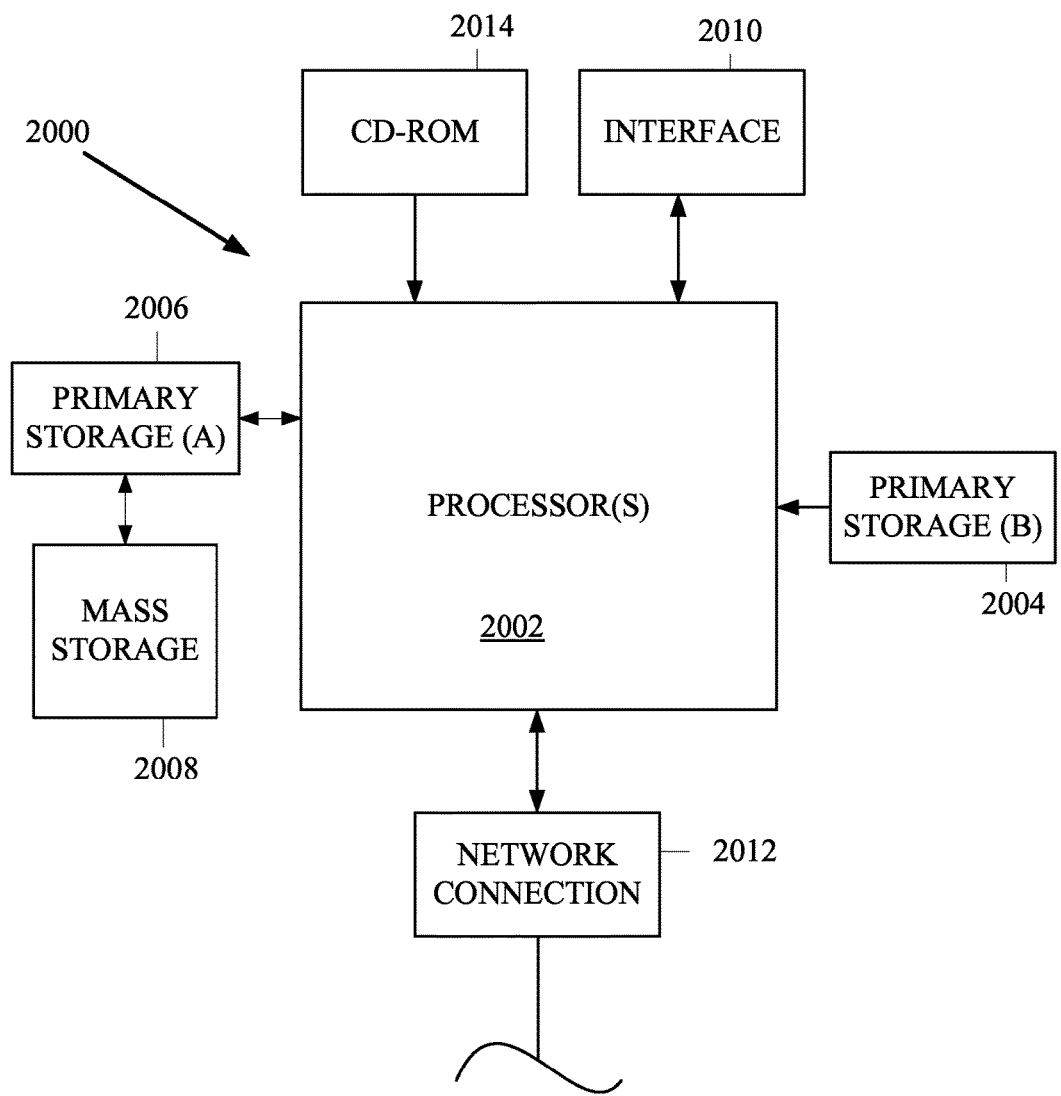
FIG. 5 is a block diagram of a typical computer system that can serve as a computational apparatus according to certain embodiments.

FIG. 5 illustrates, in simple block format, a typical computer system that, when appropriately configured or designed, can serve as a computational apparatus according to certain embodiments. The computer system 2000 includes any number of processors 2002 (also referred to as central processing units, or CPUs) that are coupled to storage devices including primary storage 1906 (typically a random access memory, or RAM), primary storage 2004 (typically a read only memory, or ROM). CPU 2002 may be of various types including microcontrollers and microprocessors such as programmable devices (e.g., CPLDs and FPGAs) and non-programmable devices such as gate array ASICs or general-purpose microprocessors. In the depicted embodiment, primary storage 2004 acts to transfer data and instructions uni-directionally to the CPU and primary storage 2006 is used typically to transfer data and instructions in a bi-directional manner. Both of these primary storage devices may include any suitable computer-readable media such as those described above. A mass storage device 2008 is also coupled bi-directionally to primary storage 2006 and provides additional data storage capacity and may include any of the computer-readable media described above. Mass storage device 2008 may be used to store programs, data and the like and is typically a secondary storage medium such as a hard disk. Frequently, such programs, data and the like are temporarily copied to primary memory 2006 for execution on CPU 2002. It will be appreciated that the information retained within the mass storage device 2008, may, in appropriate cases, be incorporated in standard fashion as part of primary storage 2004. A specific mass storage device such as a CD-ROM 2014 may also pass data uni-directionally to the CPU or primary storage.

CPU 2002 is also coupled to an interface 2010 that connects to one or more input/output devices such as such as video monitors, track balls, mice, keyboards, microphones, touch-sensitive displays, transducer card readers, magnetic or paper tape readers, tablets, styluses, voice or handwriting recognition peripherals, USB ports, or other well-known input devices such as, of course, other computers. Finally, C P U 2002 optionally may be coupled to an external device such as a database or a computer or telecommunications network using an external connection as shown generally at 2012. With such a connection, it is contemplated that the CPU might receive information from the network, or might output information to the network in the course of performing the method steps described herein.

In one embodiment, a system such as computer system 2000 is used as a data import, data correlation, and querying system capable of performing some or all of the tasks described herein. Information and programs, including data files can be provided via a network connection 2012 for downloading by a researcher. Alternatively, such information, programs and files can be provided to the researcher on a storage device.

In a specific embodiment, the computer system 2000 is directly coupled to a data acquisition system such as a microarray or high-throughput screening system that captures data from samples. Data from such systems are provided via interface 2012 for analysis by system 2000. Alternatively, the data processed by system 2000 are provided from a data storage source such as a database or other repository of relevant data. Once in apparatus 2000, a memory device such as primary storage 2006 or mass storage 2008 buffers or stores, at least temporarily, relevant data. The memory may also store various routines and/or programs for importing, analyzing and presenting the data.

The disclosure may be embodied in a fixed media or transmissible program component containing logic instructions and/or data that when loaded into an appropriately configured computing device cause that device to perform one or more of the analytical operations described above on a dataset (e.g. classify behavior into bouts, identify circadian patterns to behavioral bouts, classify within cluster behaviors, compare groups, etc.) according to the methods of this disclosure.

Figure 6:
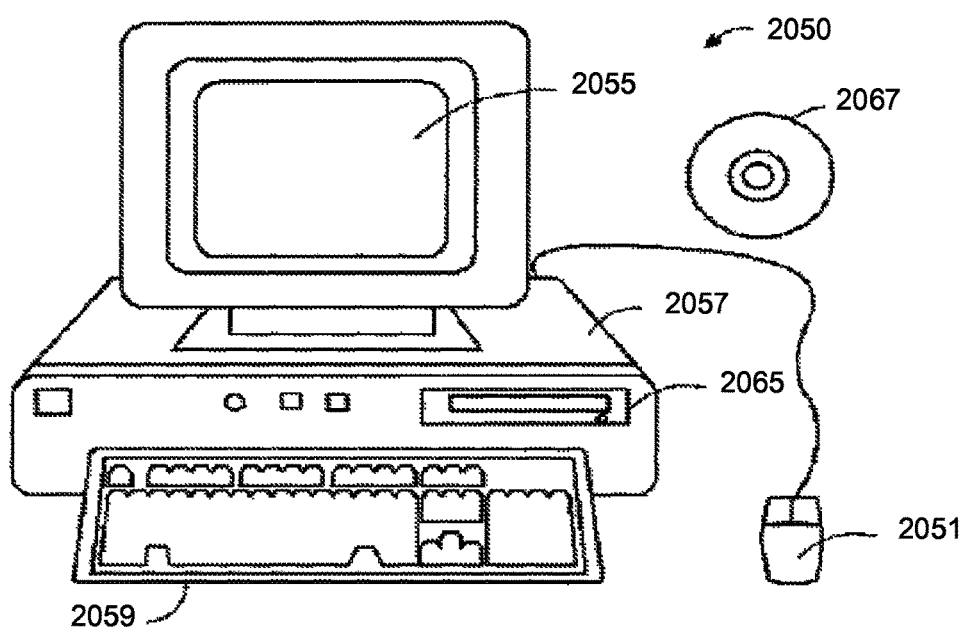
FIG. 6 illustrates a computer that may be used to implement the methods according to some embodiments.

FIG. 6 shows digital device that may be understood as a logical apparatus that can read instructions from media 2067 and/or network port 2069. Apparatus 2050 can thereafter use those instructions to direct analysis of data, create, sort, search, and read database, and the like. In certain embodiments, the digital device can be directly connected to one or more cage behavioral systems according to this disclosure and, optionally function in realtime. In certain embodiments, the digital device can simply access, analyze, and/or manipulate previously collected data.

One type of logical apparatus that may embody the disclosure is a computer system as illustrated in 2050, containing CPU 2057, optional input devices 2059 and 2061, disk drives 2065 and optional monitor 2055. Fixed media 2067 can be used to program such a system and can represent disk-type optical and/or magnetic media, and/or a memory or the like. Communication port 2069 can also be used to program such a system and can represent any type of communication connection (e.g. a connection to a data acquisition system).

The disclosure also may be embodied within the circuitry of an application specific integrated circuit (ASIC) or a programmable logic device (PLD). In such a case, the disclosure may be embodied in a computer understandable descriptor language that can be used to create an ASIC or PLD that operates as herein described.

The methods of this disclosure can be implemented in a localized or distributed computing environment. In a distributed environment, the methods can be implemented on a single computer including multiple processors or on a multiplicity of computers. The computers can be linked, e.g. through a common bus, but more preferably the computer(s) are nodes on a network. The network can be a generalized or a dedicated local or wide-area network and, in certain preferred embodiments, the computers may be components of an intra-net or an internet.

A system for classifying animal subjects can be implemented as a multi-tenant system on a computer system with a plurality of processing units and memories distributed over a computer network, wherein the network may include intranet on LAN and/or the Internet. In some embodiments, the distributed computing architecture involves a "cloud," which is a collection of computer systems available over a computer network for computation and data storage. In some embodiments, one or more users belonging to each tenant organization or entity can access the classification system on computers distributed over an intranet and/or the Internet.

In certain internet embodiments, a client system typically executes a Web browser and is coupled to a server computer executing a Web server. The Web browser is typically a program such as Microsoft's Internet Explorer, or Thunderbird or Opera. The Web server may be a program such as IBM's HTTP Daemon or other WWW daemon. The client computer can be bi-directionally coupled with the server computer over a line or via a wireless system. In turn, the server computer can be bi-directionally coupled with a website (server hosting the website) providing access to software implementing the methods of this disclosure.

A user of a client connected to the Intranet or Internet can cause the client to request resources that are part of the web site(s) hosting the application(s) providing an implementation of the methods of this disclosure. Server program(s) then process the request to return the specified resources (assuming they are currently available). A standard naming convention has been adopted, known as a Uniform Resource Locator ("URL"). This convention encompasses several types of location names, presently including subclasses such as Hypertext Transport Protocol ("http"), File Transport Protocol ("ftp"), gopher, and Wide Area Information Service ("WAIS"). When a resource is downloaded, it may include the URLs of additional resources. Thus, the user of the client can easily learn of the existence of new resources that he or she had not specifically requested.

The software implementing the method(s) of this disclosure can run locally on a server hosting the website in a true client-server architecture. Thus, the client computer posts requests to the host server which runs the requested process(es) locally and then downloads the results back to the client. Alternatively, the methods of this disclosure can be implemented in a "multi-tier" format wherein a component of the method(s) are performed locally by the client. This can be implemented by software downloaded from the server on request by the client (e.g. a Java application) or it can be implemented by software "permanently" installed on the client.

In one embodiment the application(s) implementing the methods of this disclosure are divided into frames. In this paradigm, it is helpful to view an application not so much as a collection of features or functionality but, instead, as a collection of discrete frames or views. A typical application, for instance, generally includes a set of menu items, each of with invokes a particular frame—that is, a form which manifest certain functionality of the application. With this perspective, an application is viewed not as a monolithic body of code but as a collection of applets, or bundles of functionality. In this manner from within a browser, a user would select a Web page link which would, in turn, invoke a particular frame of the application (i.e., subapplication). Thus, for example, one or more frames may provide functionality for inputing and/or accessing feature data for particular animals or strains, while another frame provides tools for clustering and classifying, and the like.

In addition to expressing an application as a collection of frames, an application can also be expressed as a location on the Intranet and/or Internet; a URL (Universal Resource Locator) address pointing the application. Each URL preferably includes two characteristics: content data for the URL (i.e., whatever data is stored on the server) together with a data type or MIME (Multipurpose Internet Mail Extension) type. The data type allows a Web browser to determine how it should interpret data received from a server (e.g., such as interpreting a .gif file as a bitmap image). In effect, this serves as a description of what to do with the data once it is received at the browser. If a stream of binary data is received as type HTML, the browser renders it as an HTML page. If instead it is received type bitmap, on the other hand, the browser renders it as a bitmap image, and so forth.

In one embodiment of particular interest, a technique for associating a host application with a document is through a use of MIME types. MIME provides a standardized technique for packaging a document object. It includes a MIME header for indicating which application is appropriate for hosting the document, all contained in a format suitable for transmission across the Internet.

In one preferred embodiment, the methods of the present disclosure are implemented, in part, with the use of a MIME type specific to the use of the methods of this disclosure. The MIME type contains information necessary to create a document (e.g., Microsoft ActiveX Document) locally but, in addition, also includes information necessary to find and download the program code for rendering the view of the document, if necessary. If the program code is already present locally, it need only be downloaded for purpose of updating the local copy. This defines a new document type which includes information supporting downloadable program code for rendering a view of the document.

The MIME type may be associated with a file extension of .APP. A file with the .APP extension is an OLE Document, implemented by an OLE DocObject. Because the .APP file is a file, it can be placed on a server and linked to using an HTML HREF. The .APP file preferably contains the following pieces of data: (1) the CLSID of an ActiveX object, which is an OLE Document Viewer implemented as one or more forms appropriate to the use of the methods of this disclosure; (2) the URL of the codebase where the object's code can be found, and (3) (optionally) a requested version number. Once the APP DocObject handler code is installed and registers the APP MIME type, it can be used to download an .APP file into the user's Web browser.

On the server side, since the .APP file is really a file, the Web server simply receives the request and returns the file to the client. When the APP file is downloaded, the .APP DocObject handler asks the operating system to download the codebase for the object specified in the .APP file. This system functionality is available in Windows through the CoGetClassObjectFromURL function. After the ActiveX object's codebase is downloaded, the .APP DocObject handler asks the browser to create a view on itself, for instance, by calling the ActivateMe method on the Explorer document site. The Internet Explorer then calls the DocObject back to instantiate a view, which it does by creating an instance of the ActiveX view object from the code that was downloaded. Once created, the ActiveX view object gets in-place activated in the Internet Explorer, which creates the appropriate form and all its child controls.

Once the form is created, it can establish connections back to any remote server objects it needs to perform its functions. At this point, the user can interact with the form, which will appear embedded in the Internet Explorer frame. When the user changes to a different page, the browser assumes responsibility for eventually closing and destroying the form (and relinquishing any outstanding connections to the remote servers).

In one preferred embodiment, from an end-user's desktop, the entry point to the system is the corporate home or the home page of another particular web-site. The page can, optionally, include, in a conventional manner, a number of links. In response to the user clicking on a particular link to an application page (e.g. a page providing the functionality of the methods of this disclosure), the web browser connects to the application page (file) residing on the server.

In one embodiment, where the user requests access to the methods of this disclosure, the user is directed to a particular page type, e.g., an application (appdoc) page for in-place execution of an application (implementing one or more elements of the methods of this disclosure) in the Web browser. Since each application page is located using an URL, other pages can have hyperlinks to it. Multiple application pages can be grouped together by making a catalog page that contains hyperlinks to the application pages. When the user selects a hyperlink that points to an application page, the Web browser downloads the application code and executes the page inside the browser.

Upon the browser downloading the application page, the browser (based on the defined MIME type) invokes a local handler, a handler for documents of a type. ore particularly, the application page preferably includes a Globally Unique Identifier (GUID) and a codebase URL for identifying a remote (downloadable) application to invoke for hosting the document. Given the document object and the GUID which arrive with the application page, the local handler looks to the client machine to see if the hosting application already resides locally (e.g., by examining Windows 95/NT registry). At this point the local handler can choose to invoke a local copy (if any) or download the latest version of the host application.

Different models of downloading code are commonly available. When code is downloaded, a "code base" specification (file) is initially requested from the server. The code base itself can range from a simple DLL file to a Cabinet file (Microsoft .cab file) containing multiple compressed files. Still further, an information (e.g., Microsoft.inf) file can be employed for instructing the client system how to install the downloaded application. These mechanisms afford great flexibility in choosing which component of an application gets downloaded and when.

In certain embodiments, the machinery employed for actually downloading program code itself relies on standard Microsoft ActiveX API (Application Programming Interface)-calls. Although the ActiveX API does not provide native support for Web-delivered applications, its API can be invoked for locating the correct version of the program code, copying it to the local machine, verifying its integrity, and registering it with the clients operating system. Once the code has been downloaded, the handler can proceed to invoke the now-present application host for rendering the document object (in a manner similar to invoking the hosting application through the registry if it were already installed).

Once the hosting application (OLE server) is loaded at the client, the client system can employ the OLE document view architecture to render the application correctly within the browser, including using conventional OLE methodology for adding the application's menu to that of the browser and for correctly re-sizing the application upon a re-size of the browser (as oppose to requiring the application to execute within a single Active X control rectangle—the limitation previously noted). Once the application is executing at the client, it can execute remote logic such as using RPC (Remote Procedure Call) methodology. In this manner logic which is preferably implemented as remote procedure(s) can still be used.

Methods of implementing Intranet and/or Intranet embodiments of computational and/or data access processes are well known to those of skill in the art and are documented in great detail (see, e.g., Cluer et al. (1992) A General Framework for the Optimization of Object-Oriented Queries, Proc SIGMOD International Conference on Management of Data, San Diego, Calif., Jun. 2 5, 1992, SIGMOD Record, vol. 21, Issue 2, June, 1992; Stonebraker, M., Editor; ACM Press, pp. 383 392; ISO-ANSI, Working Draft, "Information Technology-Database Language SQL", Jim Melton, Editor, International Organization for Standardization and American National Standards Institute, July 1992; Microsoft Corporation, "ODBC 2.0 Programmer's Reference and SDK Guide. The Microsoft Open Database Standard for Microsoft Windows™ and Windows NT™, Microsoft Open Database Connectivity™ Software Development Kit", 1992, 1993, 1994 Microsoft Press, pp. 3 30 and 41 56; ISO Working Draft, "Database Language SQL-Part 2: Foundation (SQL/Foundation)", CD9075 2:199. chi. SQL, Sep. 11, 1997, and the like).

Some implementations provide an unsupervised classification system for classifying subjects into two or more groups of interest. The system includes one or more memories configured to store feature vectors; and logic configured to perform the following operations: (a) provide a feature vector for each of a plurality of subjects in a pair of subject groups, wherein each feature vector includes data for a plurality of features for one subject, each feature corresponding to a behavior, property or characteristic of the subject; (b) split the plurality of subjects into two clusters by performing a cluster analysis for each feature; (c) score each feature by comparing subjects in the two clusters for each feature and subjects in the pair of subject groups; (d) select one or more features that score higher than other features; and (e) combine the selected features to form a pair-wise discriminator between the pair of subject groups. In some implementations, the unsupervised classification system also includes an animal monitoring device configured to collect data of a plurality of features from animal subjects.

Those skilled in the art will recognize many modifications can be made to this configuration without departing from the scope of the present disclosure. For example, in a two-tier configuration, the server system executing the functions of the WWW gateway may also execute the functions of the Web server. For example, any one of the above described embodiments could be modified to accept requests from users/user terminals that are in a format other than a URL. Yet another modification would involve the adaptation to a multi-manager environment.

Example: Unsupervised Classification of High-Dimensional Behavioral Data

This example provides methods according to some embodiments for the classification of a set of individuals from among several conditions or groups (e.g. 16 inbred strains of mice) using multiple measurements referred to as features (e.g. amount of food consumed by a mouse in a 2 hr circadian time bin). The approach includes three parts that result in correct classification of individuals as belonging to one of multiple groups, based on multiple features associated with each individual. Aspects of the disclosure include any one of these parts used with or without the others parts. Notably, the method in this example also produces estimates of statistical significance or "p-values" for the classifications. The ability to confidently assign p values to classifications is another novel benefit of this method; it is not achieved by commonly used supervised classification approaches.

The method has utility for dissecting the interactions between features and groups (e.g. between behaviors and genotypes) in this example of classifying 16 inbred strains of mice from home enclosure monitoring measurements.

(1) Unsupervised Pair-Wise Feature Rank Ordering Using K-Means

A first section described here provides methods to determine, in a manner making the fewest assumptions possible, the most useful features for differentiating between two groups of individuals. These features will then be used in the next parts to classify individuals into their respective groups. In this working example (classification of 16 inbred strains of mice), the experimenters focused on data collected during the animal's active period, the 12 hour "dark cycle" or "DC". On a single day, measurements from each individual mouse produce a set of 108 total features=18 (feature types)×6 (two hr time bins). In this example, the 18 feature types are: ASProbability, ASRate, ASDuration, TotalFood, TotalWater, TotalDistance, FeedingASBoutRate, DrinkingASBoutRate, LocoASBoutRate, FeedingBoutSize, DrinkingBoutSize, LocoBoutLenght, FeedingBoutIntensity, DrinkingBoutIntensity, LocoBoutSpeed, FeedingBoutDuration, DrinkingBoutDuration, LocoBoutDuration.

For instance, the feature "ASProbability" (which is the percent of time in a bin an animal spent in "active states") yields 6 numbers, one for each 2 hr time period in a day or "Bin". A description of bouts and the active state concept can be found in the above-referenced U.S. Patent Publication No. 2010-0324861.

This 108-dimensional vector of features for one mouse on one specific day is referred to as a "mouse-day". Each mouse-day is thus a multi-dimensional "data-point". In this strain dataset, there are 2280 total mouse-days (2280 108-dimensional feature vectors) from 190 mice during 12 days of cage measurements. For cross-validation purposes, the experimenters divide this dataset (randomly) in two, calling one half with 1140 mouse-days the "train" dataset and the other half the "test" dataset. The train dataset is used to determine useful features for classification, while the test set is used to assess classification generalization performance on novel data. The experimenters only report on results with the test set (although the results are similar in both the test set and the train set).

A total of 120 different pairs of strains can be chosen from the 16 strains as C(16,2)=120. For each of the 120 possible pairs, the experimenters determined a "rank ordering" of the 108 features, which is an ordering of the features by their usefulness in group discrimination. To determine this feature rank ordering for a given pair of strains, the experimenters ran an unsupervised K-means clustering algorithm (with K=2 for two groups) on each single feature to determine a splitting of the mouse-days from the two strains into two groups. Before clustering, a preprocessing step takes place to normalize the data to obtain Z-scores of the feature values, whereby each feature value in a data-point is divided by the standard deviation of that feature's values across the individuals in a group. This normalizes a feature in the sense that high variance (and therefore non-discriminating) features get sent towards zero to reduce their impact on clustering after Z-scoring.

Given the partitioning from the K-means clustering, the experimenters computed a "discriminability score" between 0.5 and 1 (see the section Scoring below) indicating the accuracy of the discrimination. A score of 1 is the highest score and is only achieved if all data-points are correctly classified; on the other hand, a score near 0.5 indicates a random or arbitrary classification. The rank ordering was then taken as the ordering of all features by this discriminability score.

Figure 2A:
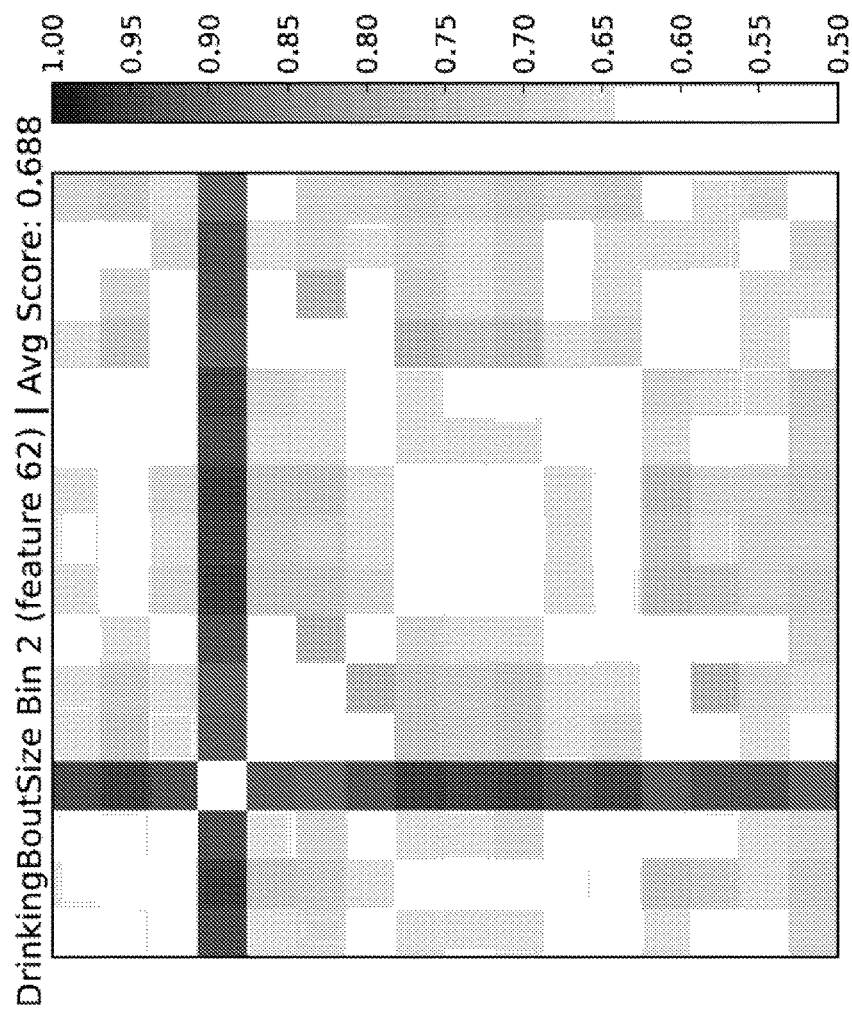
FIG. 2A is a matrix showing pair-wise discrimination scores for a feature (DrinkingBoutSize Bin2, feature 62) in discriminating between groups in 120 different pairings.
Figure 4A:
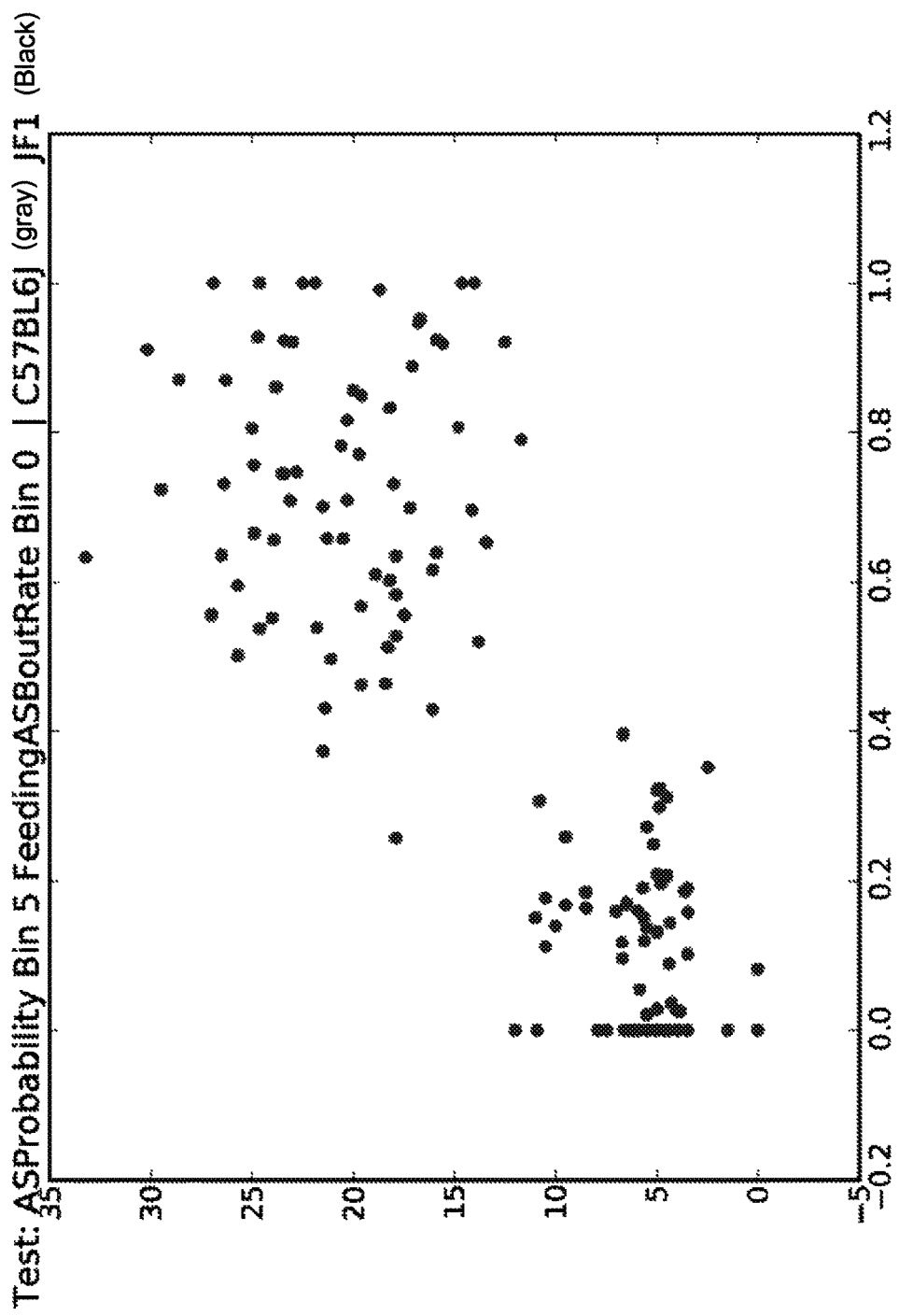
FIG. 4A is a scatter plot showing 144 mouse-days in two most highly ranked feature dimensions ("ASProbability Time Bin 5" and "FeedingASBoutRate Time Bin 0") from strains C57BL6J, JF1.
Figure 4C:
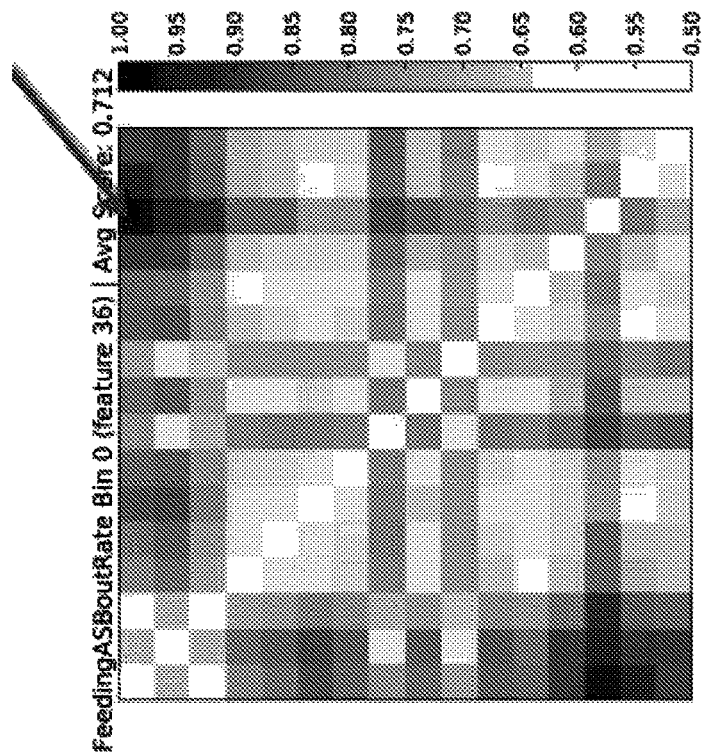
FIG. 4B is a pair-wise matrix of discriminability scores for features ASProbability (Bin 5) and FIG. 4C is a pair-wise matrix of discriminability scores for features FeedingASBoutRate (Bin 0).
Figure 4B:
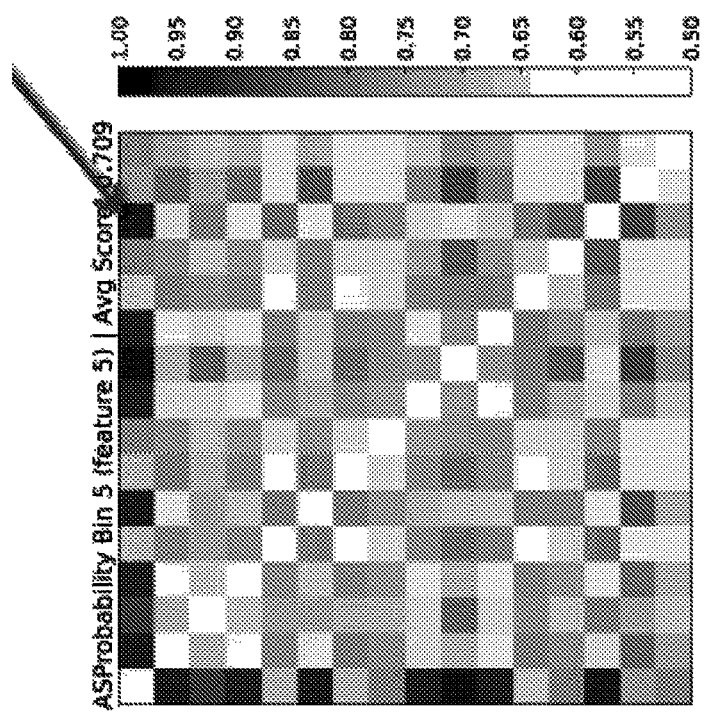

FIG. 2A and FIGS. 4B and 4C display the resulting pair-wise discrimination scores for three features in discriminating between groups in the 120 different pairings. In these figures, the shaded squares in a 16×16 matrix indicate discriminability scores for each distinct pair of strains (labeled 1-16), with the darkest shade indicating a perfect discrimination score of 1 and white color indicating the lowest score of 0.5. For the pair-wise discrimination score matrices, the numbering of rows goes from 1 (top) to 16 (bottom). The numbering of Columns goes from 1 (left) to 16 (right). The strains assigned to each number can be found in the FIG. 2B.

FIG. 2A shows a relatively simple example of behavioral dissection that can be accomplished with the method. In this figure, the dark horizontal and vertical bands in the matrix indicate that individual mouse-days from Strain 4 (mouse line 129S1) can be nearly 100% discriminated from all other strains using the single feature "DrinkingBoutSize" (for the 2 hr DC time Bin 2). Indeed, as FIG. 2B corroborates, the strain average of 129S1 has drinking bout size that is significantly different across the circadian day from all other strains.

Figure 2B:
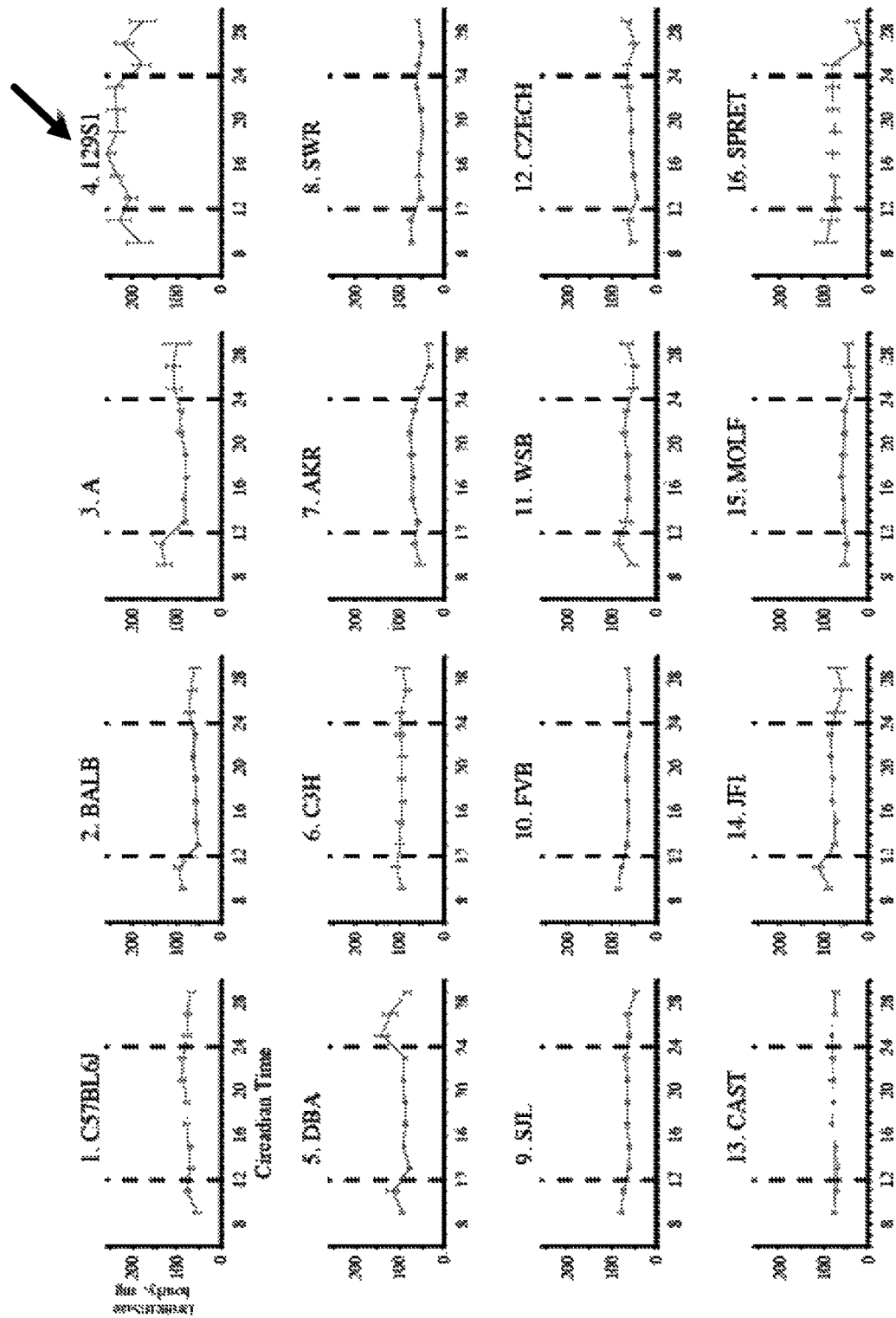
FIG. 2B shows strain averages of the feature DrinkingBoutSize for each strain over a circadian day (dotted vertical lines represent beginning and end of the mouse Dark Cycle).

FIG. 2A shows pair-wise discrimination scores for each of the 120 pairs of 16 mouse strains using DrinkingBoutSize (DC Bin 2). FIG. 2B shows strain averages of the feature DrinkingBoutSize for each strain over a circadian day (dotted vertical lines represent beginning and end of the mouse Dark Cycle). The arrow in FIG. 2B indicates the mouse strain (129S1) that has high pair-wise discrimination scores shown as horizontal and vertical bands in FIG. 2A.

Figure 2C:
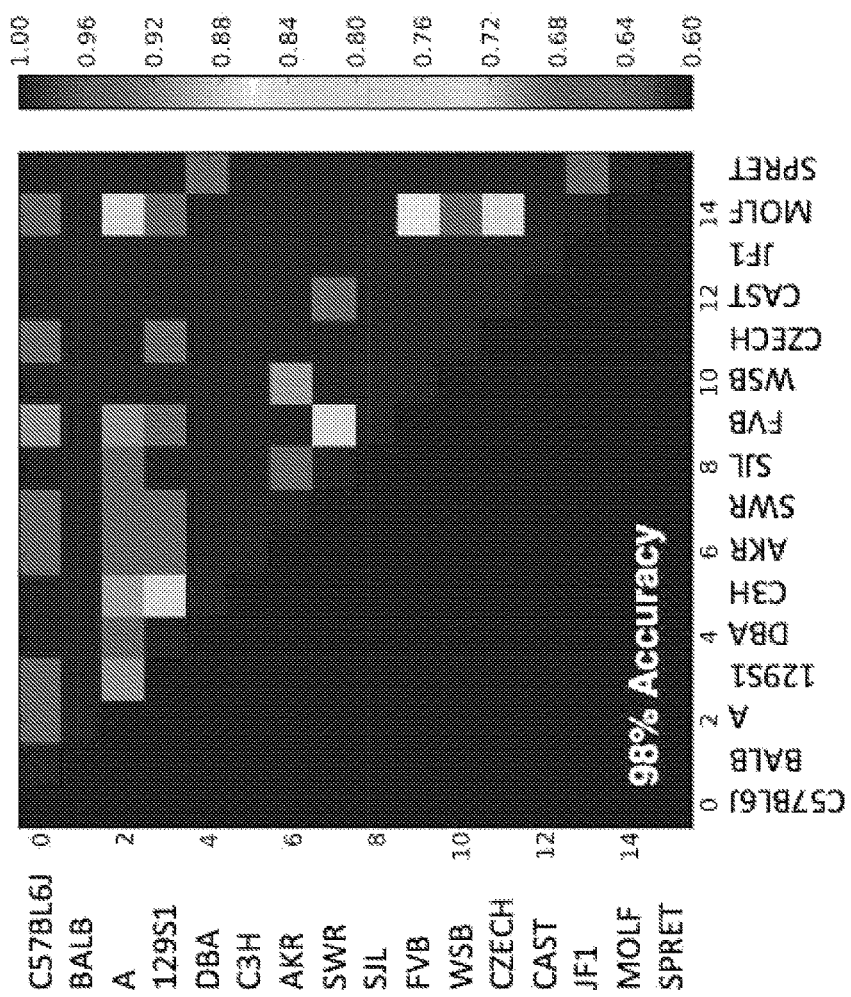
FIG. 2C shows pair-wise discrimination scores for unsupervised clustering of all combinations of 16 strains of mice' individual mouse-days of data.
Figure 2D:
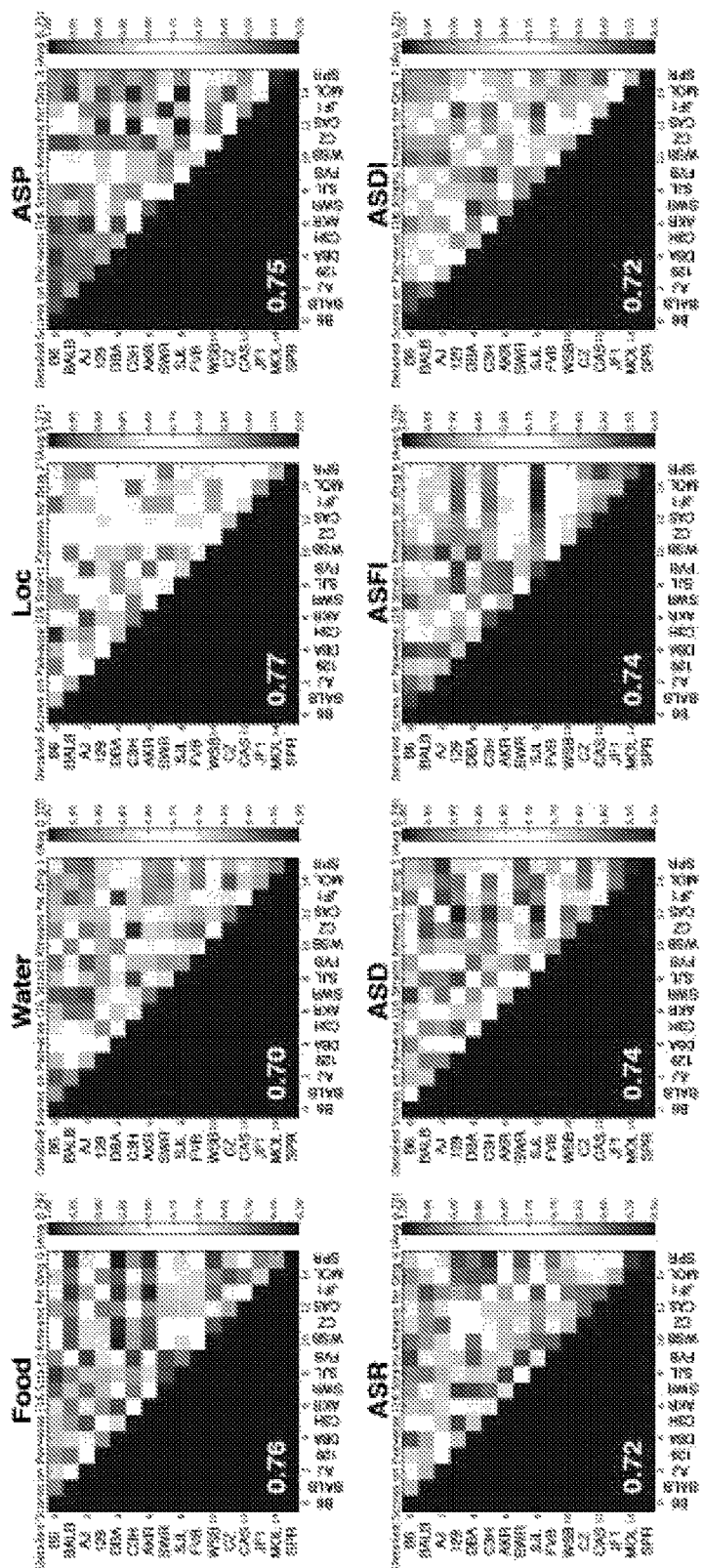
FIG. 2D displays the discriminability provided by each of 8 features for all pair-wise comparisons of 16 strains of mice (ASP: AS Probability, ASR: AS Rate, ASD: AS Duration, ASFI: AS Feeding Intensity, ASDI: AS Drinking Intensity).

In a related analysis, instead of using a single feature DrinkingBoutSize (DC Bin 2) as the analysis in FIG. 2A, 27 features are combined to enable extreme precision of strain classification on the basis of behavior alone. Individual mouse-days of data from each strain were pooled for pair-wise comparisons of all combinations of 16 strains (approximately 110 mouse-days per strain). Each individual mouse-day of data correctly segregated with an overall 98% accuracy. See FIG. 2C. Moreover, phenotypes can be dissected by quantifying the extent to which each feature can discriminate among any grouping of strains. For example, FIG. 2D displays the discriminability provided by each of 8 features for all pair-wise comparisons of 16 strains (ASP: Active State (AS) Probability, ASR: AS Rate, ASD: AS Duration, ASFI: AS Feeding Intensity, ASDI: AS Drinking Intensity).

(2) Unsupervised Pair-Wise Classifier Using K-Means

The next part of the approach involves running a K-means algorithm again for each pair of strains, but this time on subsets of the mouse-day features that are highly ranked. This produces "centroids" (averages of the data-points in a pair-wise discrimination), which can be used in the next step for full classification of individuals into one of many groups. For instance, using the top 64 ranked features out of 108 features for each of the 120 possible pairs of 16 strains, the experimenters obtained an overall 98.3% average pair-wise discrimination score. Moreover, nearly half of all pairs of strains were perfectly classified (darkest shade in FIG. 3) with an average statistical significance or "p-value" of 10e-38 (see section Statistical Significance below). Such extremely high levels of statistical significance are rare in behavioral studies. All 120 discriminability scores are displayed in FIG. 3 below.

Figure 3:
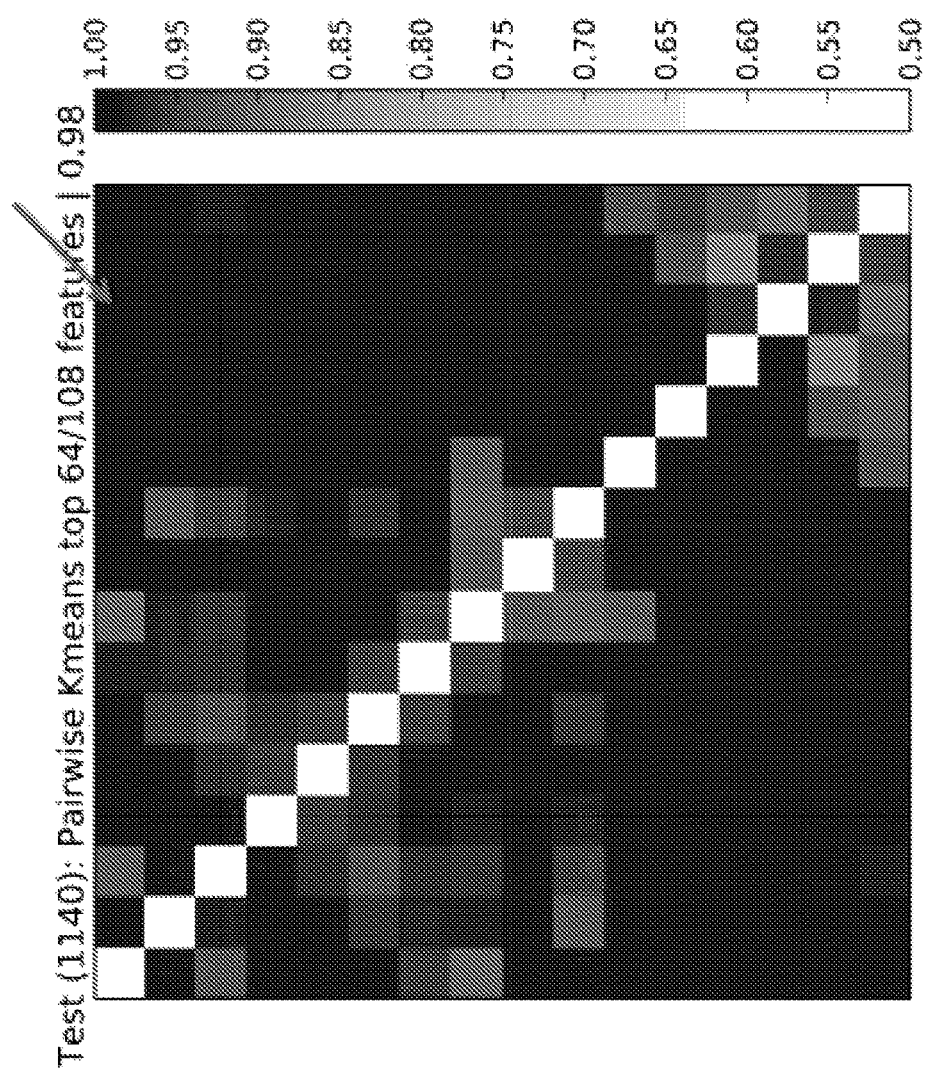
FIG. 3 shows 120 pair-wise discrimination scores of 16 strains of mice using top 64 ranked features per pair.

FIG. 3 shows 120 pair-wise discrimination scores of 16 strains using top 64 ranked features per pair. The arrow indicates accuracy for discriminating between Strains 1 and 14 (C57BL6J and JF1). To illustrate this step in greater detail, consider the single square (pointed to by the red arrow) in FIG. 3, which represents a 100% perfect discrimination of the 144 total mouse-days for testing (72 C57BL6J vs 72 JF1) into two correct two mouse strains. The p-value or probability that a random pair-wise classification would perfectly discriminate these two groups is 1.35e-42.

For these two strains, it was found that using the top 2 ranked features, "ASProbability Time Bin 5" and "FeedingASBoutRate Time Bin 0", provides perfect classification. To demonstrate how only two features could provide such a good classification, the experimenters produced a scatter plot (shown in FIG. 4A) of all 144 mouse-days in these two most highly ranked feature dimensions for this pair of strains. FIG. 4A is a scatter plot of 144 testing mouse-days from strains C57BL6J (light dots), JF1 (dark dots). The horizontal axis represents the probability of active state, and the vertical axis represents the feeding bout rate. FIG. 4A shows that the two strains are clearly separated into two clusters, with the C57BL6J (light dots) in the upper right cluster and JF1 (dark dots) in the lower left cluster. It should be noted that each individual feature alone does not completely discriminate, as shown in FIGS. 4B and 4C, demonstrating the utility of combining features to improve discriminability. FIG. 4B is a pair-wise matrix of discriminability scores for feature ASProbability (Bin 5) and FIG. 4C is a pair-wise matrix of discriminability scores for feature FeedingASBoutRate (Bin 0). Arrows indicate high (but less than perfect) discriminability scores using each of these two features for this pair of strains.

(3) Full Unsupervised Classifier Using Pair-Wise Discriminators.

In the third part of the approach, a method of obtaining a classifier that labels any given data-point (e.g. mouse-day) as one of a number of different groups (e.g. 16 mouse strains) using the pair-wise discriminators determined in (2). Given a new data-point, for each of the pair-wise discriminators which one of the 2 groups is the data-point's "nearest neighbor" is determined. The nearest neighbor can be the closest centroid in a distance such as "Euclidean distance" or "Manhattan distance" to the data-point. The data-point can be labeled with the group that had the most nearest neighbors assigned to it. An experimenter is not limited to this approach, however, for using pair-wise discrimination as in (1), (2) to perform full group (e.g. 16-strain) classification. For instance, the centroids obtained in previous steps can be used with other approaches to decide which group to label a novel data-point.

Scoring a classification of 2 groups

An example of scoring a classification of 2 groups generated by unsupervised learning is given below:

T=vector of 1s and 2s corresponding to group 1 and group 2.

L=vector of 1s and 2s with classifier's guess as to the labels for group 1 and group 2.

Here the T vector includes data representing the "ground truth" of the subjects' classification, while the L vector includes data representing the classification obtained by unsupervised machine learning of the features. The total score is the average of the two sub scores Sin and Sout, which are both between (inclusive) 0 and 1.

Sin ("In Score"): Rates how well common class membership was detected. Note: Sin=1 if all labels are identical. Of those labels in L for which T has 1s, let I1 be the count of the most common group. Of those labels in L for which T has 2s, let I2 be the count of the most common group.

$Sin=(I1+I2)/t$ where t is the total number of subjects, or the length of the T or L vector.

Sout ("Out Score"): Rates how discriminative the classification is. Note: Sout=1 if all labels are different. Of those labels in T for which L has 1 s, let O1 be the count of the most common group. Of those labels in T for which L has 2s, let O2 be the count of the most common group.

$Sout=(O1+O2)/t$

To arrive at a single score, the experimenters take the average of these two:

$S(T,L)=(Sin+Sout)/2$ e.g., T=[1, 1, 2, 2] is the ground labeling of a dataset with 6 points.

L=[1, 1, 2, 1] is classifier's labeling.

$Sin=2/4+1/4=3/4$ $Sout=2/4+1/4=3/4$ $S(T,L)=(Sin+Sout)/2=0.75$ e.g., T=[1, 1, 1, 2, 2, 2] is the ground labeling of a dataset with 6 points L=[1, 2, 1, 1, 1, 1] is classifier's labeling $Sin=2/6+3/6=5/6$ $Sout=3/6+1/6=2/3$ $S(T,L)=(Sin+Sout)/2=0.75$ This scoring method can be generalized to classifications of more than two groups.

Statistical Significance ("p-Values") for Pair-Wise Discrimination

As mentioned above and detailed below, pair-wise classification scores were calculated. These scores can be used to assess the "statistical significance" of discrimination (i.e., the likelihood that such a classification occurred by chance).

Suppose that a pair of groups were classified with a score of 1.0. This means that a perfect labeling took place. Suppose that one has m points in group A and n=(t−m) points in group B (with t being the total number of points in the dataset). Then the chance that a random labeling of m points for A and n for B would get this exact labeling is 1/(t choose m)

where (t choose m)=t(t−1) . . . (t−m+1)/[m(m−1) . . . 1] is a "binomial coefficient" (if n=m, then one needs to multiply the above quantity by 2 since there are 2 correct labelings in this case).

E.g., if one has T=[1, 1, 2, 2, 2], there are (5 choose 3)=(5 choose 2)=5*4/2=10 labelings of two 1's and three 2's to this dataset. Thus, a random such labeling has a 10% chance of being exactly correct.

E.g., T=[1, 1, 1, 2, 2, 2], there are (6 choose 3)=6*5/2=15 labelings of three 1's and three 2's to this dataset. Two of these labelings correspond to a perfect discrimination. Thus, a random such labeling has a 2/15=13.3% chance of being exactly correct.

E.g., in the C57BL6J vs JF1 example above, experimenters achieved a score of 1.0 which by chance would be:

2/(144 choose 72)~1.35*10^(−42)

For a score of S<1.0, a similar combinatorial calculation gives the probability that a random labeling has a score at least S. Thus a natural "p-value" for classification significance can be obtained.

In addition to the detailed example provided above, additional examples below show the disclosure's applicability in other settings.

Additional Examples

Next is an example showing how the method could be used to determine not only the extent to which systemic treatments with hormones and/or drugs produce behavioral change, but also to perform a fine analytical "dissection" of the treatment effects by determining the relative contributions of each of many features to the treatment differences. Even though many prior studies have examined the impact of the stress hormone corticosterone on diverse behaviors in rodents, the application of the K-means methods to large home cage behavioral datasets reveals with great sensitivity a large number of behavioral effects that had not been previously reported. Moreover, the approach reveals which of the many building blocks of behavioral patterns (behavioral elements) are most responsible for the treatment effects. This enables the formation of testable hypotheses regarding precise neural mechanisms through which treatments alter brain function and behavior.

The classification approach described herein can be applied in medical fields in diverse ways. For example, in some embodiments, the approach is used for differential diagnosis. In an example, the subjects are people, the grouping is by disease category, and the features can be taken from large datasets containing diverse clinical measures (e.g. reported symptoms, blood tests, imaging tests, etc.), demographic descriptors (e.g. gender, age, race, income, family history) and environmental influences (e.g.: job and marital satisfaction, exposures to trauma, dietary factors, etc.). Here, the method could be used to determine whether the extent to which the information can be integrated to determine the likelihood that an individual is afflicted by an array of clinical disorders (classification into diagnostic categories). The approach may not only enhance the ability to distinguish among diseases that may afflict an individual (improved differential diagnosis), it also provides the potential to identify new markers of disease and to discover new factors that contribute to disease susceptibility.

In another example application, large clinical datasets from healthy patients that subsequently develop disease can be used to reveal risk factors for disease development that have not been previously identified.

The application of the method to human subjects has great utility beyond the field of medicine. Here, the features could include demographic variables, history of particular types of life experiences, etc., to classify individuals into consumer groups that are more or less likely to buy a particular product or respond to particular type of advertisement. The relative magnitude of the impact of the various features on consumer choices could be assessed. For this and the above analyses, it is possible to derive accurate estimates of the statistical significance of the classifications and the contributions of particular features to those classifications.

What is claimed is:

1. A method, implemented at a computer system that includes one or more processors and system memory, for subject classification, the method comprising:
   (a) providing, on the computer system, a dataset comprising a plurality of feature vectors for a plurality of subjects in a pair of subject groups among three or more subject groups, wherein each feature vector comprises data for a plurality of features for one subject, each feature comprising a unit of measurement data;
   (b) splitting, for each feature and by the computer system, the plurality of subjects into a pair of clusters by performing a cluster analysis, thereby obtaining a plurality of cluster pairs for the plurality of features, each cluster pair comprising two clusters of subjects for each feature;
   (c) scoring, by the computer system, each feature's ability to discriminate between the pair of subject groups;
   (d) selecting, by the computer system, one or more features that score higher than other features;
   (e) combining, by the computer system, the selected features to form a pair-wise discriminator between the pair of subject groups; and
   (f) repeating (a)-(e) for at least one additional pair of subject groups, thereby forming multiple pair-wise discriminators for multiple pairs of subject groups among the three or more subject groups.

2. The method of claim 1, wherein the selected features comprise two or more features.

3. The method of claim 1, further comprising:
   (g) classifying which subject group a test subject belongs to by applying the pair-wise discriminators.

4. The method of claim 3, wherein (g) involves determining which one of the two groups in a pair of subject groups is a nearest neighbor of the test subject for each pair of the subject groups, and classifying the test subject as a member of a subject group that is most frequently determined to be the nearest neighbor across all pairs of subject groups under consideration.

5. The method of claim 3, further comprising obtaining a p value of the classifying of (g), which p value indicates a probability of random selection yielding the same results as the classifying of (g).

6. The method of claim 1, wherein the scoring of (c) is based on membership in the subject groups and the clusters.

7. The method of claim 1, wherein the cluster analysis comprises a K-means clustering.

8. The method of claim 1, wherein (e) comprises splitting, by the computer system, at least some of the plurality of subjects into two multidimensional clusters by performing a K-means clustering for a combination of features, and using information of the two multidimensional clusters to form the pair-wise discriminator.

9. The method of claim 8, further comprises cross-validating the pair-wise discriminator using data of subjects complementary to the subjects used to form the pair-wise discriminator.

10. The method of claim 1, wherein the clustering in (b) is performed on a training set comprising a randomly selected subset of the dataset, the method further comprising cross-validating the pair-wise discriminator using a test set complementary to the training set.

11. The method of claim 6, wherein (c) comprises calculating a score for each feature based on (i) a count of subjects who are both members of a cluster and members of the more common subject group for the cluster, or (ii) a count of subjects who are both members of a subject group and members of the more common cluster for the subject group.

12. The method of claim 1, wherein at least some feature vectors comprise behavioral measurements.

13. The method of any of claim 1, wherein the subjects are rodents, mammals, or humans.

14. The method of claim 1, wherein the subject groups are defined by genotype, drug treatment, diet, treatment with a hormone, normal mice versus humanized mouse models of a disease of interest, normal versus high fat diet.

15. The method of claim 14, wherein the hormone is corticosterone.

16. The method of claim 1, wherein the dataset comprises behavioral data collected from an animal cage that monitors animal behavioral.

17. The method of claim 1, wherein the subject groups are defined by disease states and the features are clinical features, the method further comprising identifying clinical features as disease susceptibility factors.

18. An unsupervised classification system for classifying subjects into two or more groups of interest, the system comprising:
   one or more memories configured to store feature vectors; and
   logic configured to:
   (a) provide a feature vector for each of a plurality of subjects in a pair of subject groups among three or more subject groups, wherein each feature vector comprises data for a plurality of features for one subject, each feature corresponding to a behavior, property or characteristic of the subject;
   (b) split the plurality of subjects into two clusters by performing a cluster analysis for each feature;
   (c) score each feature by comparing subjects in the two clusters for the feature and subjects in the pair of subject groups;
   (d) select one or more features that score higher than other features;
   (e) combine the selected features to form a pair-wise discriminator between the pair of subject groups; and
   (f) repeating (a)-(e) for at least one additional pair of subject groups, thereby forming multiple pair-wise discriminators for multiple pairs of subject groups among the three or more subject groups.

19. A method, implemented at a computer system that includes one or more processors and system memory, for entity classification, the method comprising:
   (a) providing, on the computer system, a dataset comprising a plurality of feature vectors for a plurality of entities in a pair of entity groups among three or more entity groups, wherein each feature vector comprises data for a plurality of features for one subject, each feature comprising a unit of measurement data;
   (b) splitting, for each feature and by the computer system, the plurality of entities into a pair of clusters by performing a cluster analysis, thereby obtaining a plurality of cluster pairs for the plurality of features, each cluster pair comprising two clusters of entities for each feature;
   (c) scoring, by the computer system, each feature's ability to discriminate between the pair of entity groups;
   (d) selecting, by the computer system, two or more features that score higher than other features;
   (e) combining, by the computer system, the selected features to form a pair-wise discriminator between the pair of entity groups; and
   (f) repeating (a)-(e) for at least one additional pair of entity groups, thereby forming multiple pair-wise discriminators for multiple pairs of entity groups among the three or more entity groups.

\* \* \* \* \*